(12) United States Patent
Conway et al.

(10) Patent No.: US 9,777,758 B2
(45) Date of Patent: Oct. 3, 2017

(54) CLIP ASSEMBLY FOR USE HOLDING SINUOUS SPRINGS

(71) Applicant: L&P Property Management Company, South Gate, CA (US)

(72) Inventors: Lawrence J. Conway, Des Plaines, IL (US); Scott A. Bridges, Lake Villa, IL (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 15/226,163

(22) Filed: Aug. 2, 2016

(65) Prior Publication Data

US 2016/0338501 A1 Nov. 24, 2016

Related U.S. Application Data

(63) Continuation-in-part of application No. 14/501,696, filed on Sep. 30, 2014, now Pat. No. 9,427,094, which is a continuation-in-part of application No. 13/648,611, filed on Oct. 10, 2012, now Pat. No. 8,991,016.

(51) Int. Cl.
| | |
|---|---|
| *A47C 31/06* | (2006.01) |
| *F16B 15/00* | (2006.01) |
| *F16B 2/22* | (2006.01) |
| *F16B 15/06* | (2006.01) |
| *A47C 23/26* | (2006.01) |
| *A47C 23/16* | (2006.01) |

(52) U.S. Cl.
CPC .......... *F16B 15/0015* (2013.01); *A47C 23/16* (2013.01); *A47C 23/26* (2013.01); *F16B 2/22* (2013.01); *F16B 15/06* (2013.01); *Y10T 24/3455* (2015.01); *Y10T 24/3476* (2015.01)

(58) Field of Classification Search
CPC ......... A47C 31/06; A47C 23/16; A47C 23/26; A47C 23/057; A47C 31/04; F16B 15/0015; F16B 2/22; Y10T 24/3455; Y10T 24/3476

See application file for complete search history.

(56) References Cited

U.S. PATENT DOCUMENTS

| | | |
|---|---|---|
| 2,111,404 A | 3/1938 | Pankonin |
| 2,526,902 A | 10/1950 | Rublee |
| 2,574,811 A | 11/1951 | Blumensaadt |
| 3,083,369 A | 4/1963 | Peterson |
| 3,252,569 A | 5/1966 | Matthews |

(Continued)

FOREIGN PATENT DOCUMENTS

| | | |
|---|---|---|
| DE | 2250375 | 7/1973 |
| WO | 9743192 | 11/1997 |

*Primary Examiner* — Robert J Sandy
*Assistant Examiner* — Michael Lee
(74) *Attorney, Agent, or Firm* — Wood, Herron & Evans, LLP

(57) ABSTRACT

A piece of furniture includes a rectangular frame for supporting a plurality of sinuous springs. A plurality of clip assemblies are secured to opposed side walls of frame. Each clip assembly comprises at least two metal fasteners, each having a generally planar head and a shank for insertion into the frame. The generally planar head of each metal fastener is encased by plastic of a non-metallic piece. The non-metallic piece has a hook to secure one end of a sinuous wire. Connectors may be formed with the plastic or non-metallic pieces to join multiple clip assemblies.

23 Claims, 37 Drawing Sheets

(56) References Cited

U.S. PATENT DOCUMENTS

| | | |
|---|---|---|
| 3,263,294 A | 8/1966 | Pappas |
| 3,323,183 A | 6/1967 | Sterner |
| 3,422,468 A | 1/1969 | Schutz |
| 3,553,794 A | 1/1971 | Kneidl et al. |
| 3,613,878 A | 10/1971 | Langas et al. |
| 3,711,931 A | 1/1973 | Ladouceur et al. |
| 3,722,670 A | 3/1973 | Plunkett |
| 3,845,860 A | 11/1974 | Ladouceur et al. |
| 3,874,263 A | 4/1975 | Barth et al. |
| 3,940,844 A | 3/1976 | Colby et al. |
| 3,992,853 A | 11/1976 | Morris |
| 4,129,059 A | 12/1978 | Van Eck |
| 4,153,959 A | 5/1979 | Omley |
| 4,508,220 A | 4/1985 | Pearson |
| 4,935,998 A | 6/1990 | Frazier et al. |
| 4,955,813 A | 9/1990 | Fochler |
| D330,851 S | 11/1992 | Roick |
| 5,303,821 A | 4/1994 | Ayres |
| 5,314,065 A | 5/1994 | Ayres et al. |
| 5,564,564 A | 10/1996 | Poffenberger |
| 5,682,994 A | 11/1997 | Poffenberger |
| 5,833,064 A | 11/1998 | Ayres et al. |
| 5,878,880 A | 3/1999 | Poffenberger |
| 5,927,491 A | 7/1999 | Room et al. |
| 6,055,716 A | 5/2000 | Ayres et al. |
| 6,126,126 A | 10/2000 | McKiernan, Jr. |
| 6,704,974 B2 | 3/2004 | Lackler |
| 7,882,948 B2 | 2/2011 | West |
| 9,427,094 B2 | 8/2016 | Conway et al. |
| 2003/0025256 A1 | 2/2003 | Roick |
| 2014/0096346 A1 | 4/2014 | Conway et al. |

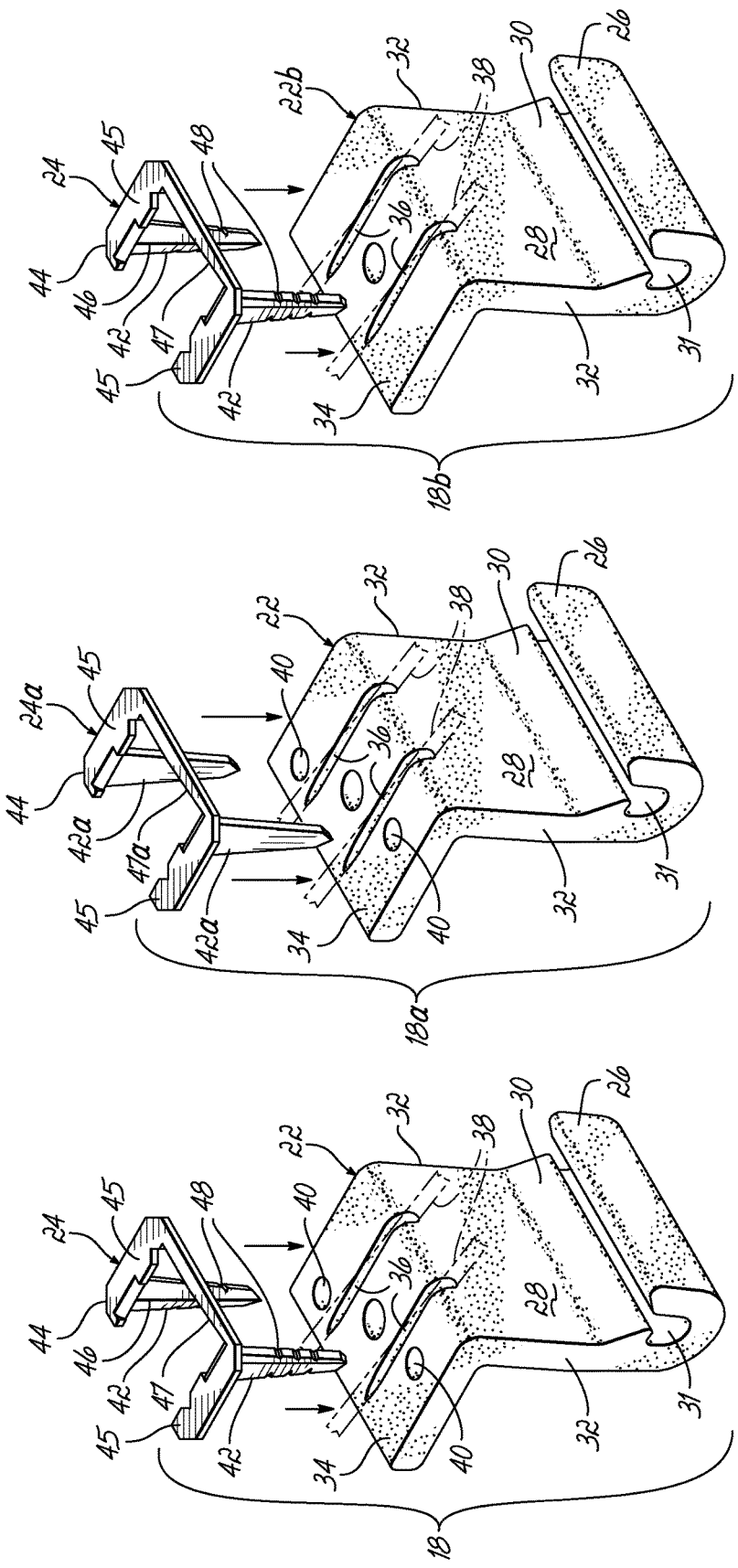

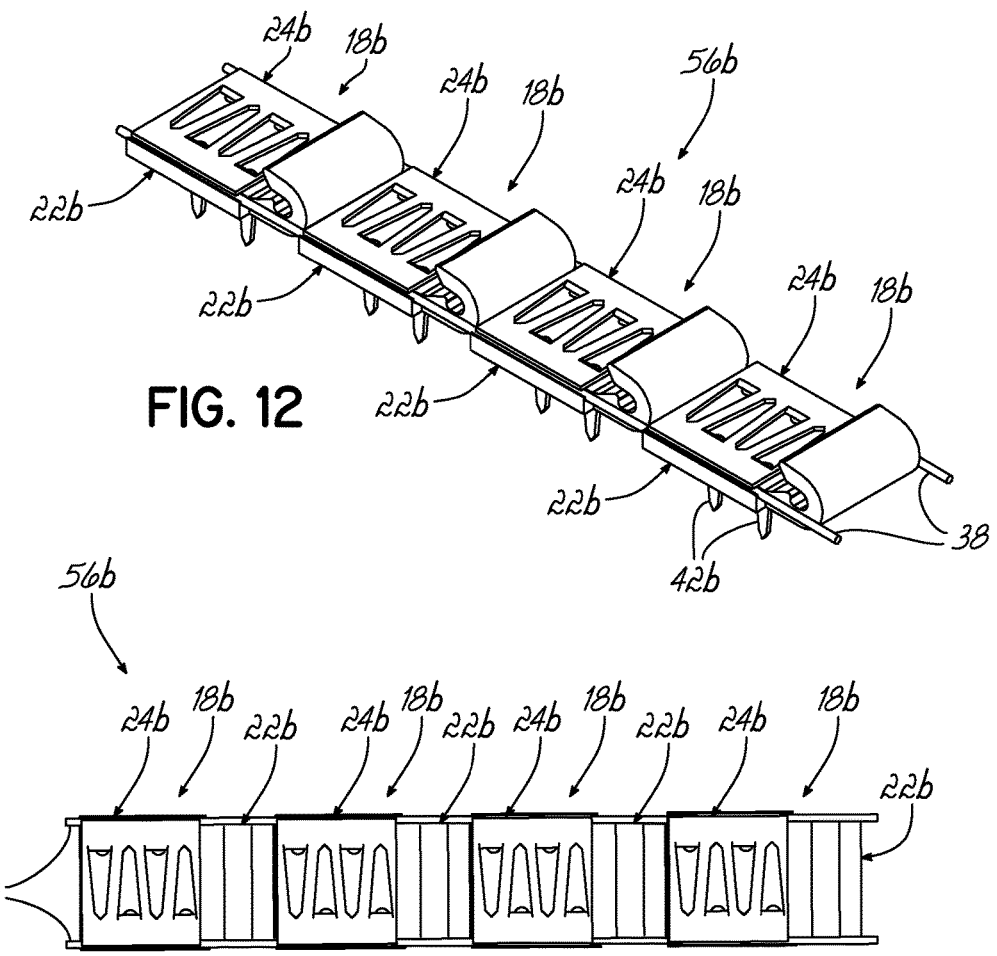
FIG. 12
FIG. 13
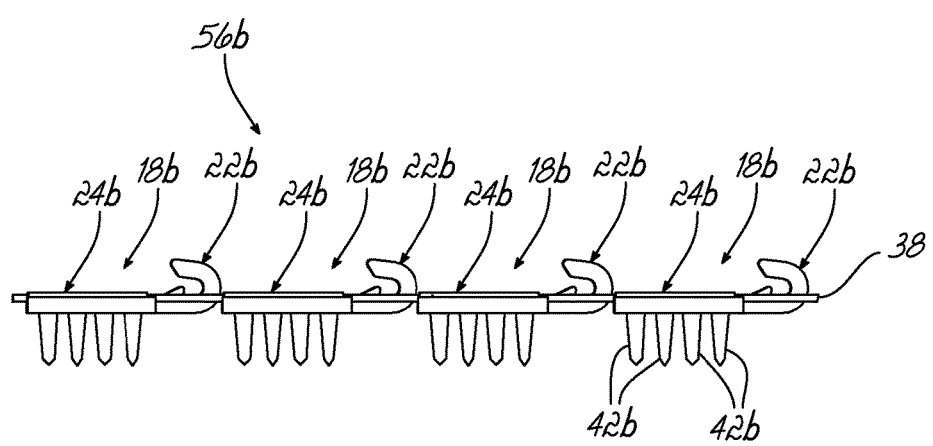
FIG. 14

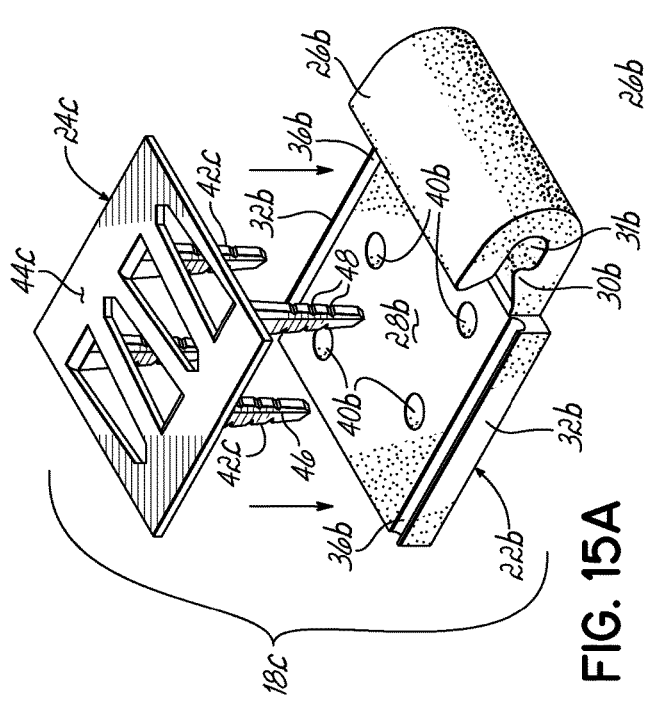
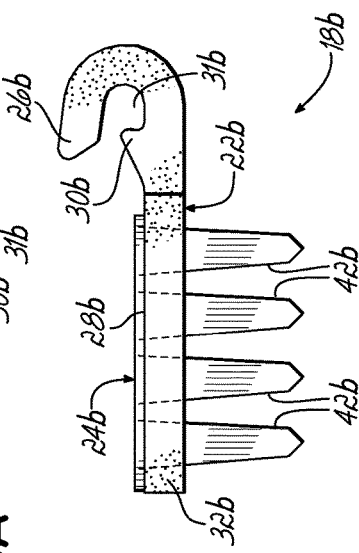
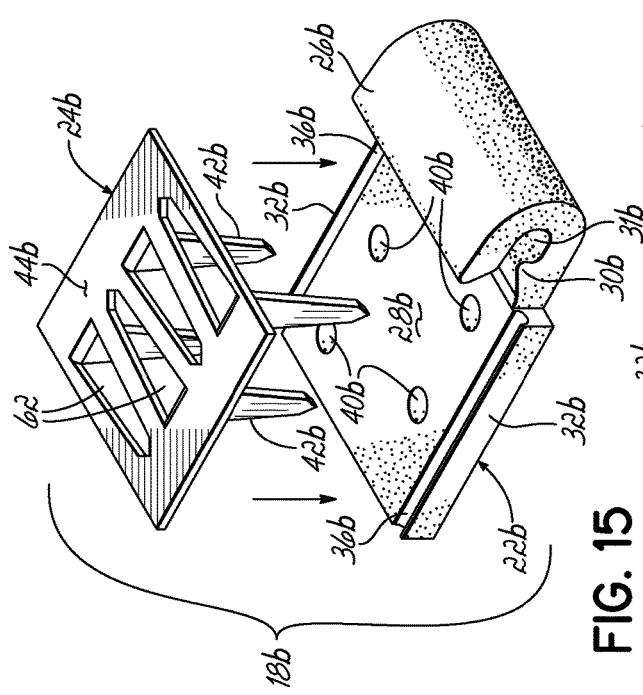
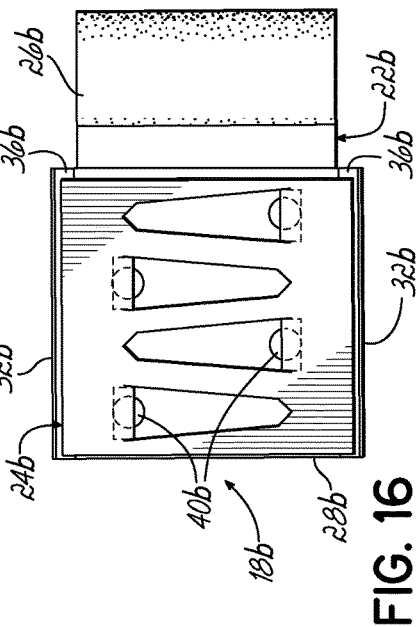

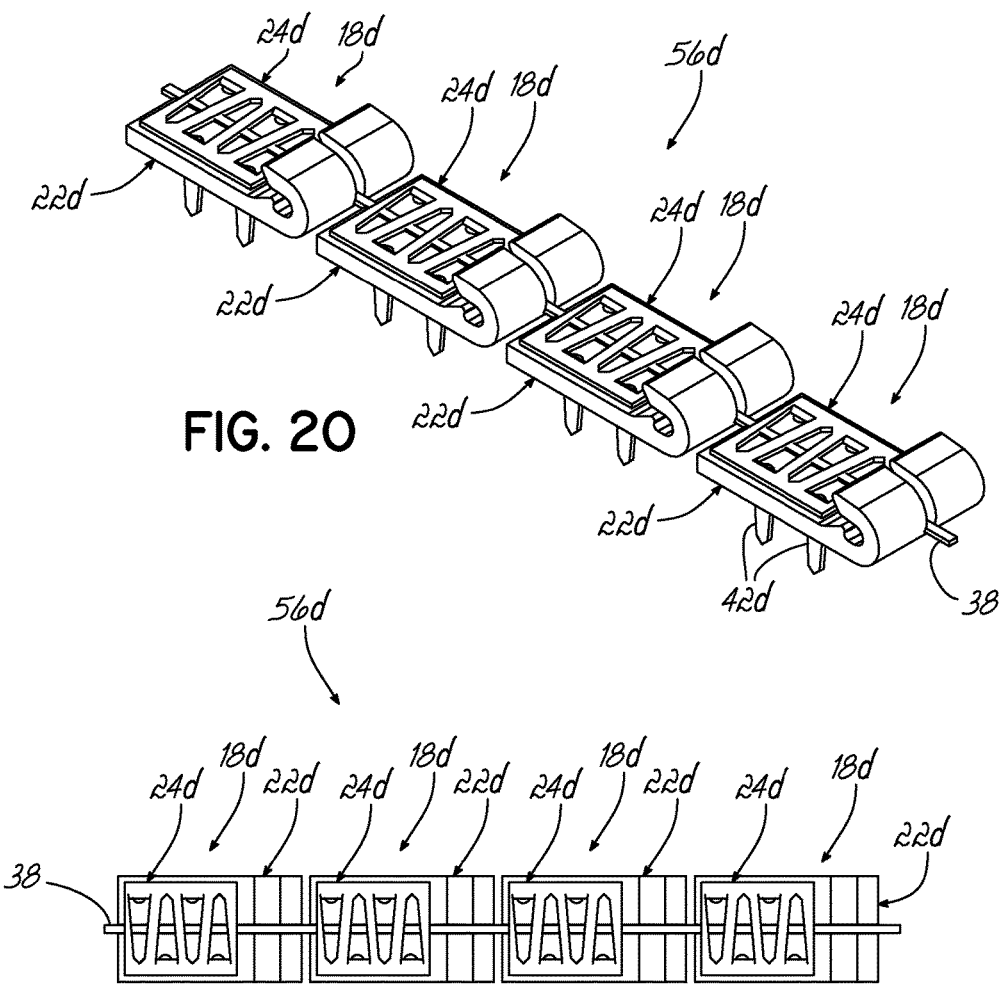
FIG. 20
FIG. 21
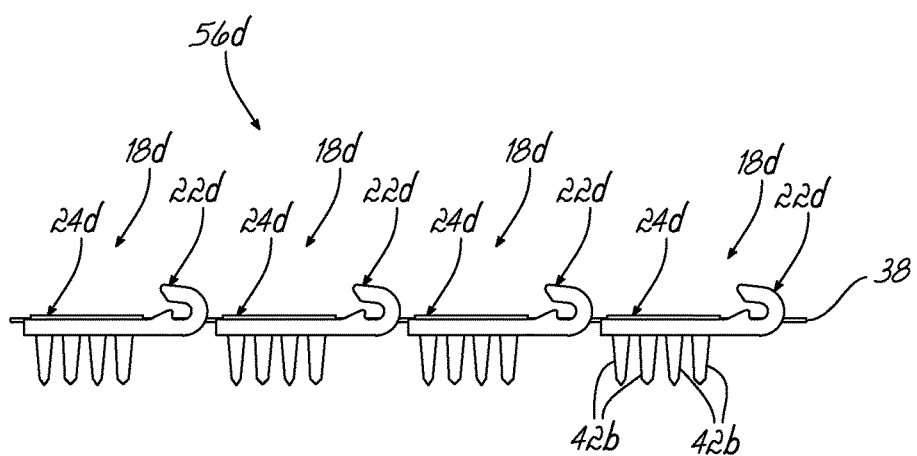
FIG. 22

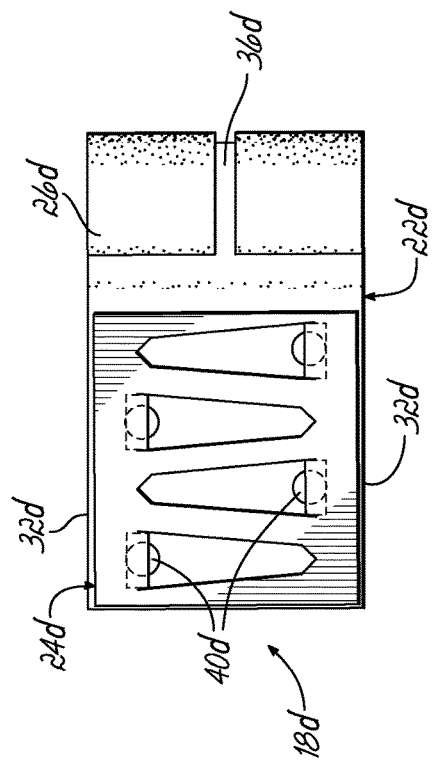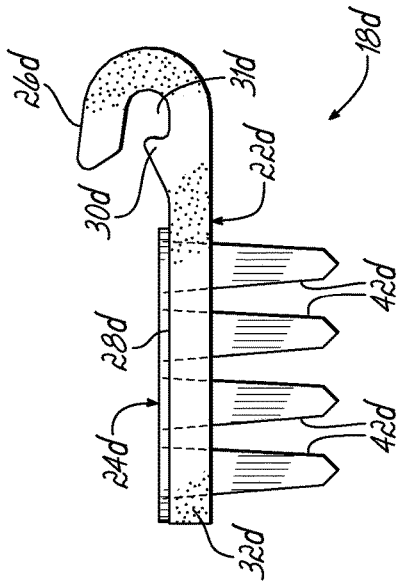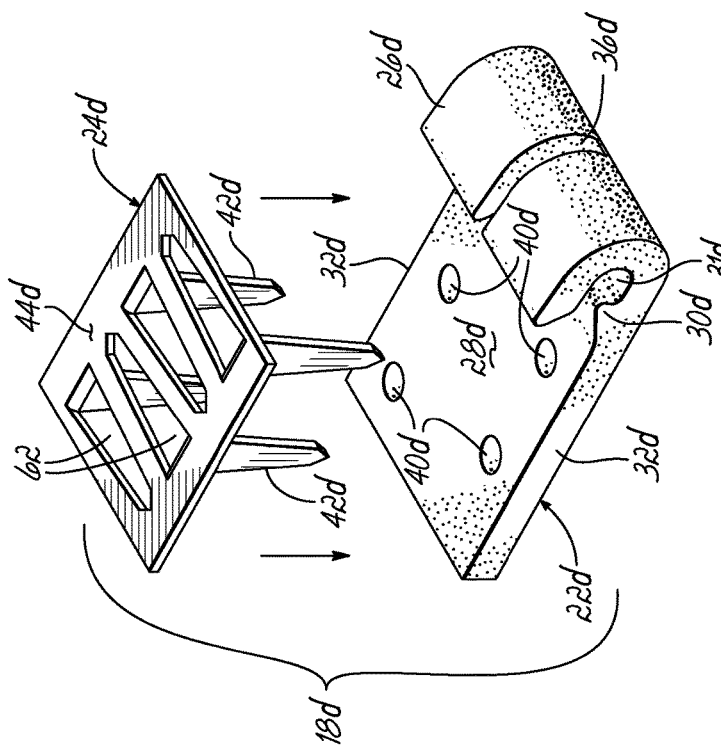

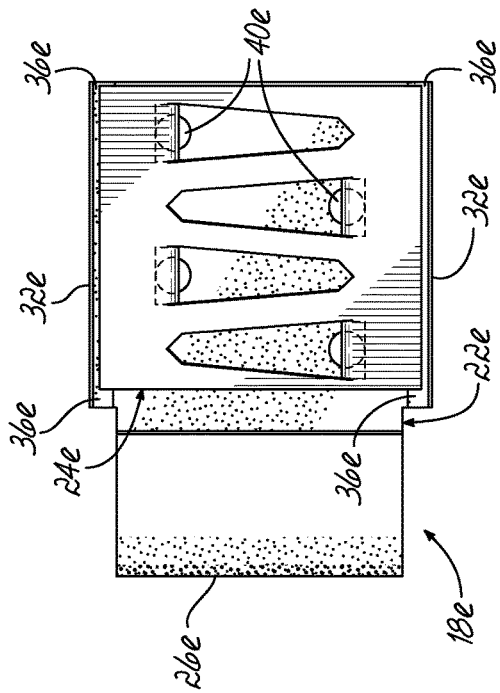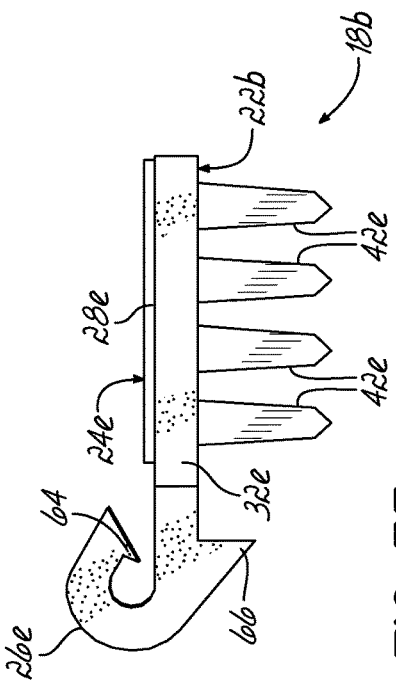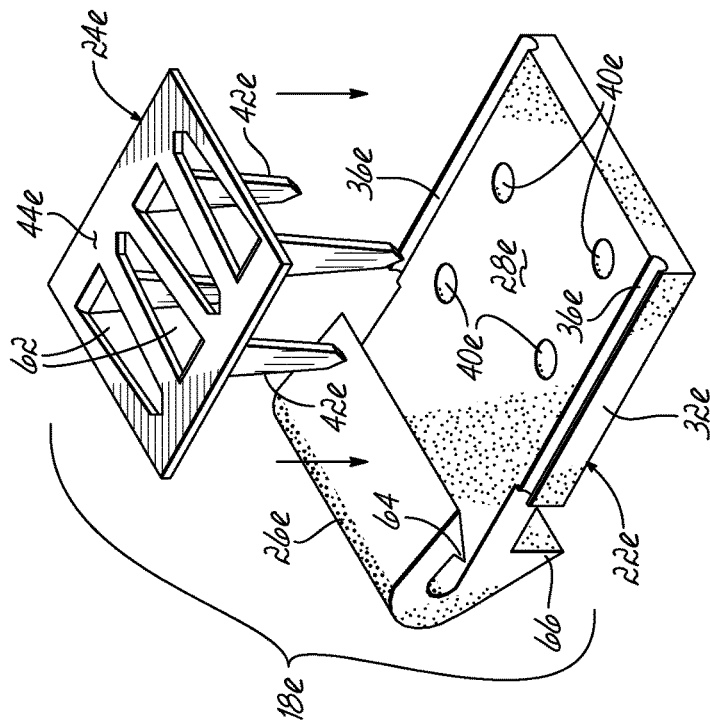

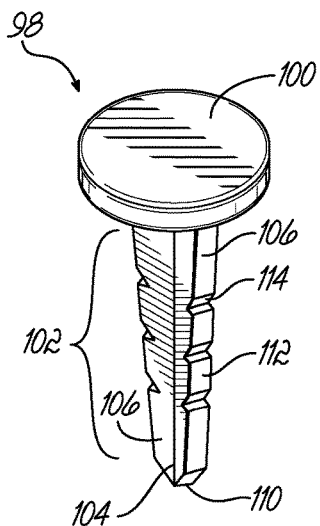
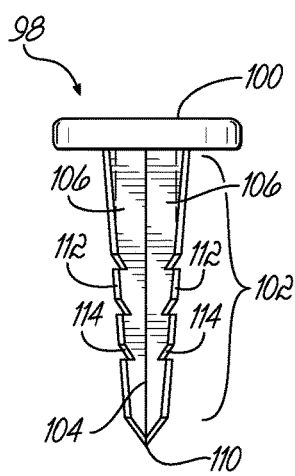
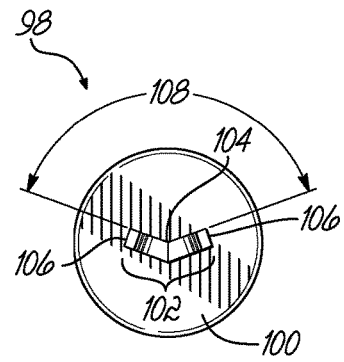
FIG. 51A
FIG. 51B
FIG. 51C
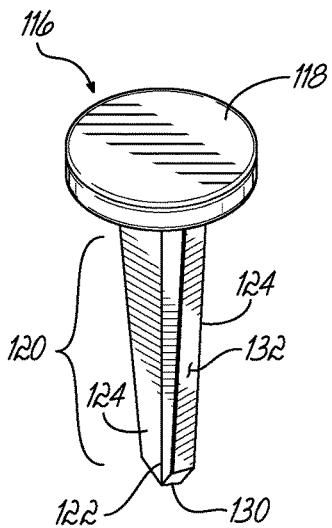
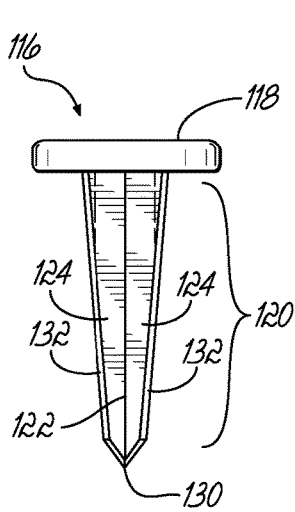
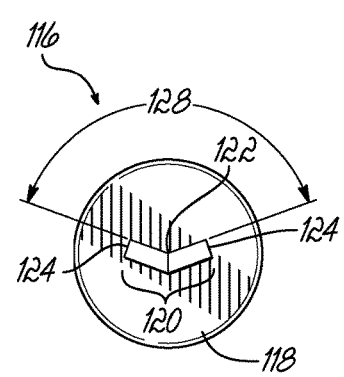
FIG. 52A
FIG. 52B
FIG. 52C

CLIP ASSEMBLY FOR USE HOLDING SINUOUS SPRINGS

CROSS-REFERENCE TO RELATED APPLICATIONS

This application is a continuation-in-part of U.S. patent application Ser. No. 14/501,696, a continuation-in-part of U.S. patent application Ser. No. 13/648,611, now U.S. Pat. No. 8,991,016, each being fully incorporated by reference herein.

FIELD OF THE INVENTION

This invention relates generally to clip assemblies for use in the manufacture of furniture and, more particularly, for holding sinuous springs in position in furniture.

BACKGROUND OF THE INVENTION

In many industries, as, for example, in the mattress or bedding industry, it is common practice to secure two wires or rods, such as a spring element of a mattress, to a border wire with clips made from sheet metal. Such clips are generally in a U-shape having an arcuate crown portion and oppositely spaced leg portions depending from the crown portion. The two wires to be connected are placed between the leg portions of the clip and the leg portions pushed together by a clinching tool, thus securing or locking the two wires together.

Such a clinching tool typically includes a J-shaped jaw into which the leading clip of a stack of clips is indexed. The clinching tool has a blade which shears off the first clip from a stack of clips placed inside the clinching tool. U.S. Pat. No. 2,574,811 shows such a clinching tool.

In order to operate the clinching tool, it is necessary to place a plurality of clips inside the clinching tool in an orderly fashion. The clips must be similarly oriented and in an abutting relationship to one another, each clip abutting the two adjacent clips in an orderly fashion.

Clips must be interconnected to each other in a flexible manner so that the stack of clips can be wound into the clinching tool.

The clips must also be interconnected with sufficient strength so that they are able to withstand high tensile forces associated with winding and unwinding of the stack of clips upon a spool in the clinching machine. Accidental breakage of the connector connecting adjacent clips would be detrimental to the operation of the clinching machine.

One common way used to interconnect similar U-shaped sheet metal clips together is by means of non-metal, elongated flexible members made of plastic. Slots or grooves through the arcuate portion of each U-shaped clip are lined up, such that the non-metallic flexible members may be placed inside all of the grooves in order to connect the clips together in a flexible manner.

Several techniques have been developed to secure the non-metallic flexible connectors inside the slots of each clip. U.S. Pat. No. 5,303,821 discloses deforming the side edges of the arcuate crown portion of each clip inwardly so as to crimp the plastic connectors inside the grooves or slots on the arcuate top portions of the sheet metal U-shaped clips. U.S. Pat. Nos. 5,564,564; 5,682,994 and 5,878,880 each disclose a U-shaped clip having tabs extending upwardly from slots formed in the arcuate crown portion of the clip. After connectors are placed inside the slots of a plurality of aligned clips, a roller or rollers pass over the arcuate crown portions of the clips to push down the tabs of each clip, thereby securing the connectors inside the slots.

U.S. Pat. No. 5,878,880 discloses a clip made of sheet metal having a U-shaped hook portion inside which is secured a sheet of cushioning material, such as plastic. When a wire is placed inside the hook portion, the cushioning material prevents wire-on-wire noise, such as squeaking. U.S. Pat. No. 5,833,064 discloses another such clip having a plastic liner to prevent metal-on-metal squeaking or "noise". Over time, these plastic liners may wear out or move/shift.

These two patents, U.S. Pat. Nos. 5,878,880 and 5,833,064, disclose U-shaped clips which may be connected to identical clips in a string and which have prongs or tacks inherently formed from the sheet metal, the prongs being bent downwardly and adapted to be inserted into wooden rails of furniture frames. These prongs or tacks have a smooth surface which may not hold the clip inside wooden rails of furniture frames as securely as desired.

Thus, there is a need for a clip assembly which may be made partially of metal and partially of plastic which does not result in squeaking or "noise" over time.

There is further a need for a clip assembly which may be constructed of less sheet metal than known clips, thereby reducing the cost of the clips.

There is further a need for a clip assembly which provides improved holding strength when inserted inside wooden rails of furniture frames.

SUMMARY OF THE INVENTION

This invention comprises a clip assembly for securing an end portion of a sinuous spring to a wooden rail. The clip assembly comprises two components: a plastic clip or piece and at least two metal fasteners molded together into a unitary clip assembly. In some embodiments, the plastic piece comprises a generally planar body portion, a U-shaped hook portion extending outwardly from one end of the body portion and a generally planar flange portion extending outwardly from the other end of the body portion in a direction generally perpendicular to the body portion. The hook portion of the plastic piece is adapted to receive and retain the end portion of a sinuous spring.

Each metal fastener has a generally planar head and a shank. The generally planar head is commonly circular, but may be any desired shape. The shank may be ribbed, creased and/or serrated to ensure a sturdy, secure connection of the clip assembly to the wood of the furniture frame. The metal fasteners and plastic piece are molded together into a unitary member, the head of each metal fastener being encased by the flange portion of the plastic piece. The shank of each metal fastener extends through the plastic piece and is adapted to extend into the wooden rail. In some embodiments, each clip assembly may have two metal fasteners. In other embodiments, each clip assembly may have four metal fasteners.

According to another aspect of this invention, the clip assembly comprises a non-metallic clip or piece having a generally planar body portion and a U-shaped hook portion extending outwardly from one end of the body portion and a generally planar flange portion extending outwardly from the other end of the body portion in a direction generally perpendicular to the body portion. The U-shaped hook portion is adapted to receive and retain a portion of a spring. The generally planar body portion of the non-metallic piece has a ledge extending from one side edge to the opposed side edge of the non-metallic piece, the hook portion and ledge being adapted to receive and retain the end portion of the sinuous spring.

The clip assembly further comprises at least two metal fasteners. Each metal fastener has a generally planar head which may be circular or any other desired shape and a shank. The shank may be ribbed, creased and/or serrated to ensure a sturdy, secure connection of the clip assembly to the wood of the furniture frame.

The metal fastener and non-metallic piece are molded together into a unitary member, the head of each metal fastener being encased by the flange portion of the non-metallic piece. The shank of each metal fastener is adapted to extend into the wooden rail.

According to another aspect of this invention, the clip assembly comprises a non-metallic piece comprising a generally planar body portion, a U-shaped hook portion extending outwardly from one end of the body portion and a generally planar flange portion extending outwardly from the other end of the body portion in a direction generally perpendicular to the body portion. The generally planar body portion of the non-metallic piece has a ledge extending from one side edge to the opposed side edge of the plastic piece, the hook portion and ledge being adapted to receive and retain the end portion of the sinuous spring. The clip assembly further comprises two spaced metal fasteners, each metal fastener having a generally planar head and a shank. The metal fasteners and non-metallic piece are molded together into a unitary member, the head of each metal fastener being encased by the flange portion of the non-metallic piece. The shanks of the metal fasteners extend through the flange portion of the non-metallic piece and are adapted to extend into the wooden rail.

BRIEF DESCRIPTION OF THE DRAWINGS

FIG. 6 is a partially disassembled view of a portion of the clip assembly of FIGS. 2B and 2C;

FIG. 6A is a partially disassembled view, similar to FIG. 6, of a portion of an alternative embodiment of clip assembly;

FIG. 6B is a partially disassembled view, similar to FIG. 6, of a portion of an alternative embodiment of clip assembly;

FIG. 12 is a perspective view of a portion of a collated string of clip assemblies of FIG. 10;

FIG. 13 is a top plan view of the portion of the collated string of clip assemblies of FIG. 12;

FIG. 14 is a side elevational view of the portion of the collated string of clip assemblies of FIG. 12;

FIG. 15 is a partially disassembled view of a portion of the clip assembly of FIG. 11;

FIG. 15A is a partially disassembled view, similar to FIG. 15, of a portion of an alternative embodiment of clip assembly;

FIG. 16 is a top plan view of the clip assembly of FIG. 15;

FIG. 17 is a side elevational view of the clip assembly of FIG. 15;

FIG. 20 is a perspective view of a portion of a collated string of clip assemblies of FIG. 18;

FIG. 21 is a top plan view of the portion of the collated string of clip assemblies of FIG. 20;

FIG. 22 is a side elevational view of the portion of the collated string of clip assemblies of FIG. 20;

FIG. 23 is a partially disassembled view of a portion of the clip assembly of FIG. 18;

FIG. 24 is a top plan view of the clip assembly of FIG. 23;

FIG. 25 is a side elevational view of the clip assembly of FIG. 23;

FIG. 31 is a partially disassembled view of a portion of the clip assembly of FIG. 28;

FIG. 32 is a top plan view of the clip assembly of FIG. 28;

FIG. 33 is a side elevational view of the clip assembly of FIG. 28;

FIG. 51A is a perspective view of another metal fastener which may be used in the clip assemblies of FIGS. 46A-47C;

FIG. 51B is a side elevational view of the metal fastener of FIG. 51A;

FIG. 51C is a bottom view of the metal fastener of FIG. 51A;

FIG. 52A is a perspective view of another metal fastener which may be used in the clip assemblies of FIGS. 46A-47C;

FIG. 52B is a side elevational view of the metal fastener of FIG. 52A;

FIG. 52C is a bottom view of the metal fastener of FIG. 52A;

DETAILED DESCRIPTION OF THE DRAWINGS

Figure 1:
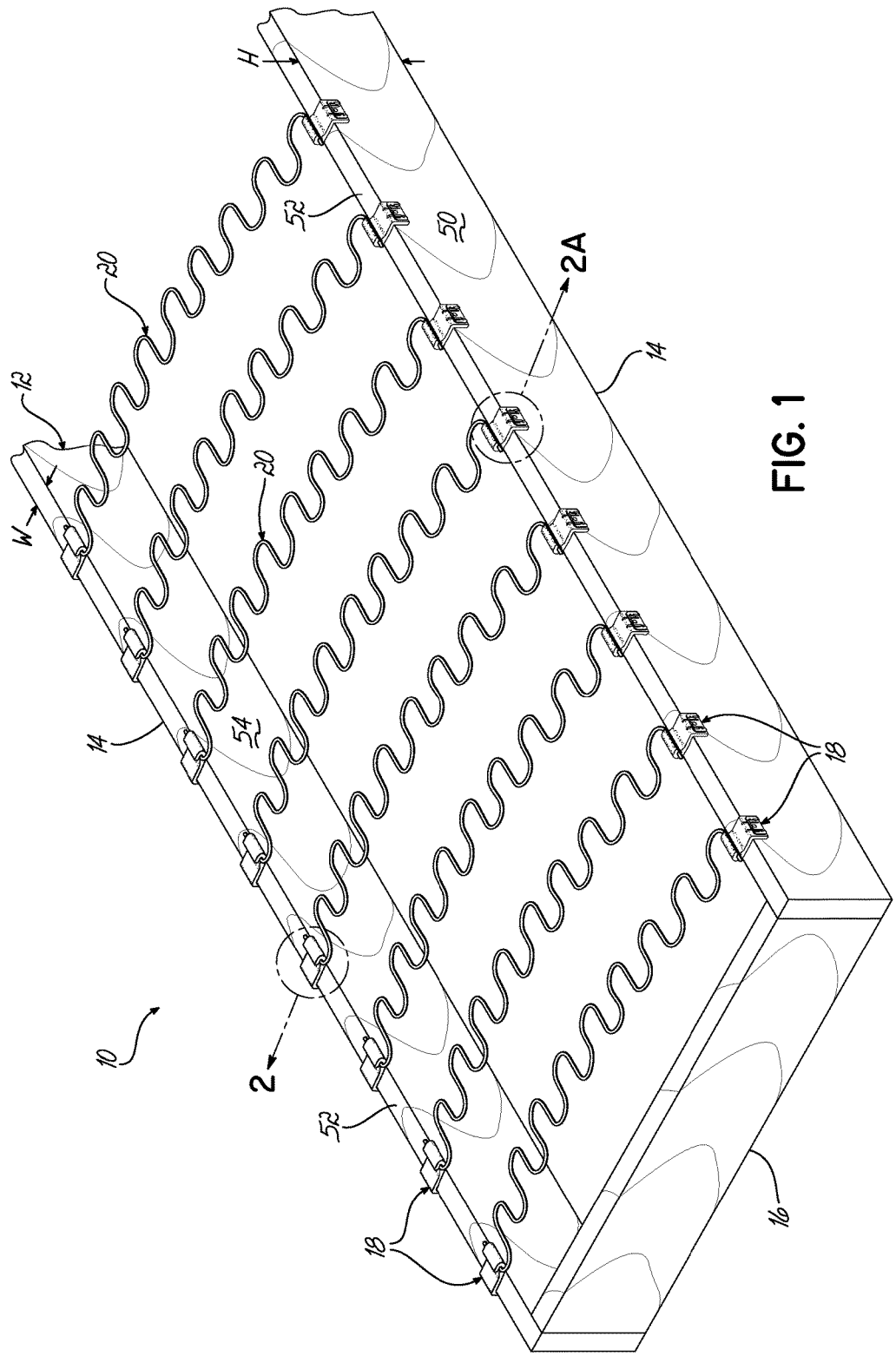
FIG. 1 is a perspective view of a furniture frame and sinuous springs extending from one side to the other side of the frame, clip assemblies in accordance with one embodiment being secured to the frame sides.

Referring to the drawings, and particularly to FIG. 1, there is illustrated a portion of a piece of furniture 10 comprising a rectangular frame 12 comprising two side walls 14 and two end walls 16 (only one being shown in FIG. 1). For purposes of this document, the word "furniture" is not intended to be limiting; it may include seats for vehicles or other frames. The frame 12 is most commonly made of wood, but may be made of other suitable materials. In the embodiment of frame 12 shown in FIG. 1, each of the side and end walls 14, 16, respectively, is placed on edge with the height "H" being greater than the width "W" of each wall.

As shown in FIG. 1, furniture piece 10 further comprises a plurality of clip assemblies 18 secured to the side walls 14 of the frame 12 in a spaced manner for securing and retaining a plurality of sinuous springs 20. Clip assemblies 18, secured to opposed side walls 14, are aligned to receive and retain end portions 21 of sinuous springs 20 in desired positions and under desired amounts of tension, as shown in FIG. 1. Commonly, such sinuous springs 20 are arched or bowed upwardly to provide resiliency to the furniture piece 10.

Figure 2A:
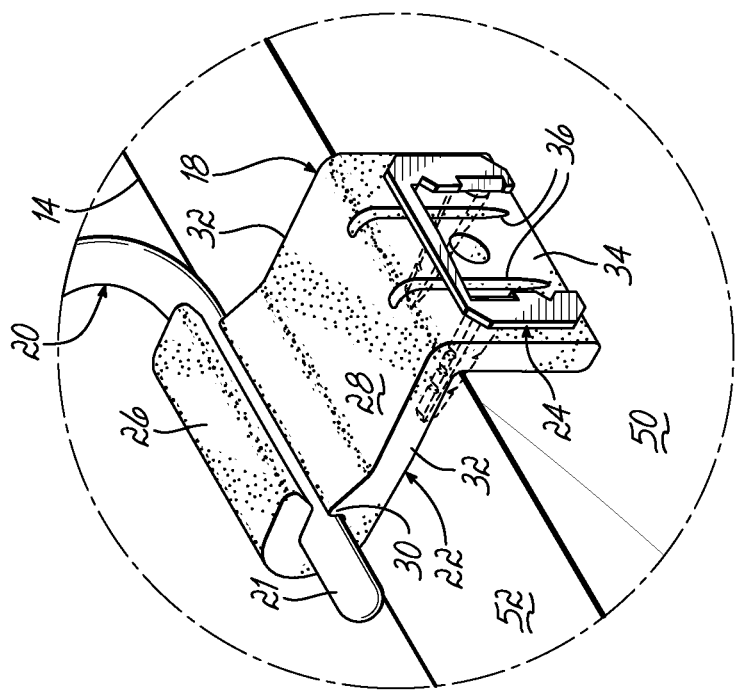
FIG. 2A is an enlarged view of the encircled area 2A of FIG. 1.
Figure 2:
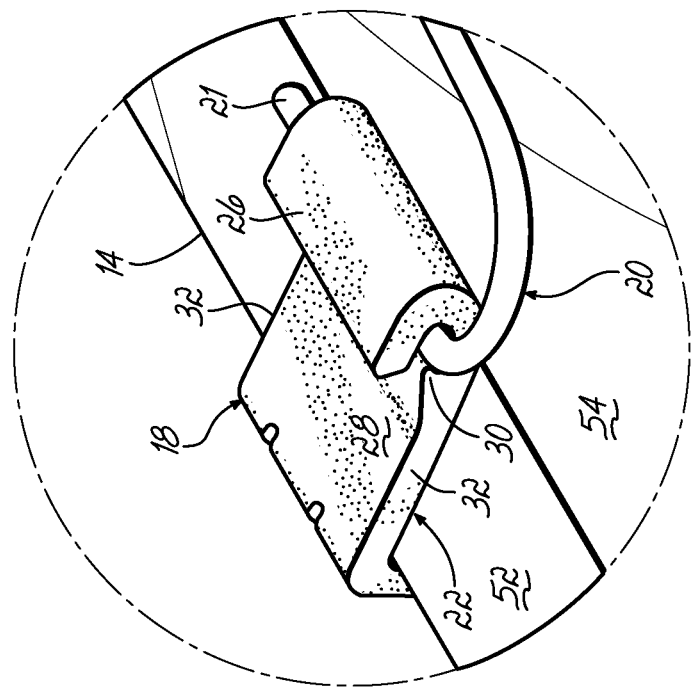
FIG. 2 is an enlarged view of the encircled area 2 of FIG. 1.

FIGS. 2 and 2A each show one of the clip assemblies 18 secured to one of the side walls 14 of frame 12. As best shown in FIG. 6, each clip assembly 18 comprises a first non-metallic piece or clip 22, usually made of plastic, and a second metal piece or fastener 24, respectively. The pieces 22, 24 are joined together and secured to one of the side walls 14 of the generally rectangular furniture frame 12.

Figure 3:
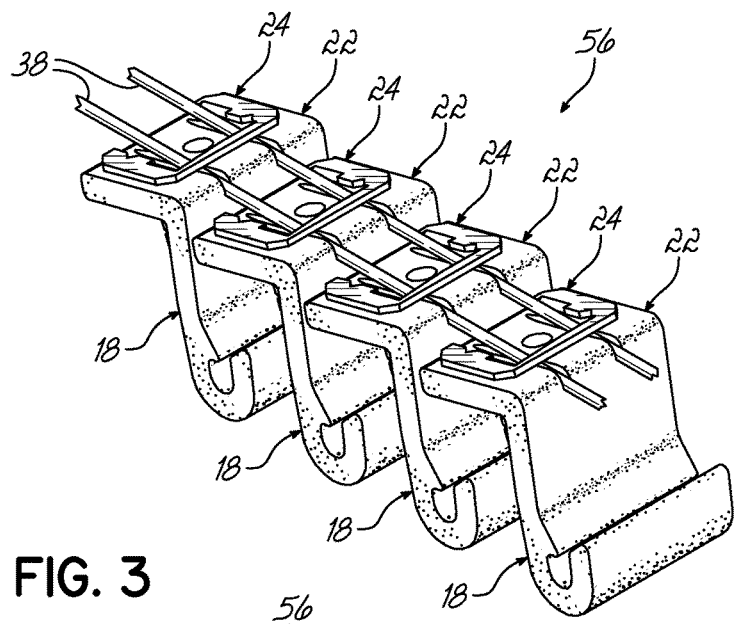
FIG. 3 is a perspective view of a portion of a collated string of clip assemblies of FIG. 1.
Figure 4:
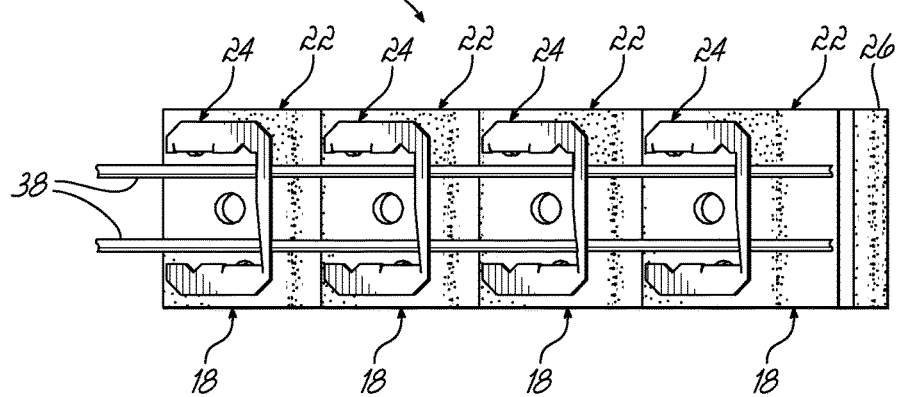
FIG. 4 is a top plan view of the portion of the collated string of clip assemblies of FIG. 3.
Figure 5:
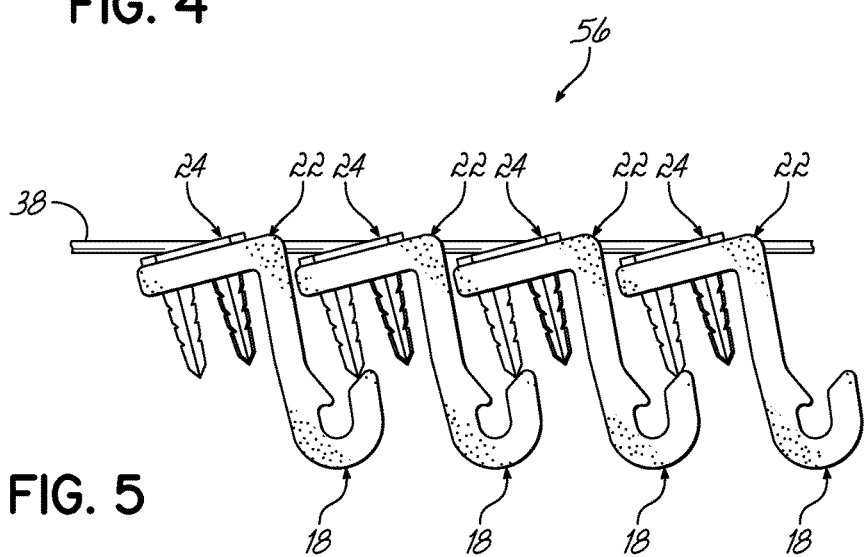
FIG. 5 is a side elevational view of the portion of the collated string of clip assemblies of FIG. 3.

The first piece 22 of clip assembly 18 comprises a U-shaped hook portion 26 adapted to receive and retain an end portion 21 of one of the sinuous springs 20. The first piece 18 further comprises a generally planar body portion 28 which includes a ledge 30 extending from one side edge 32 to the opposed side edge 32 of the body portion 28 of the first piece 22 of the clip assembly 18. When the end portion 21 of one of the sinuous springs 20 is inserted into the U-shaped hook portion 26, the ledge 30 of the body portion 28 holds or retains the end portion 21 of the sinuous spring 20 in a receptacle 31, illustrated in FIG. 8. The first piece 22 of clip assembly 18 further comprises a generally planar flange portion 34 extending outwardly from the end of the body portion 28 opposite the U-shaped hook portion 26 in a direction generally orthogonal or perpendicular to the body portion 28. As best shown in FIG. 2A, the flange portion 34 of the first piece 22 of clip assembly 18 has a pair of spaced grooves 36 adapted to receive non-metallic connectors 38 which connect multiple clip assemblies 18 together, as shown in FIGS. 3-5. In some embodiments, the grooves 36 may be omitted. For example, clip assemblies shown in FIG. 6 may lack grooves 36.

As shown in FIG. 6, the flange portion 34 of the first piece 22 of clip assembly 18 has a pair of spaced openings 40, each opening 40 extending through the thickness of the flange portion 34 of the first piece 22 of clip assembly 18. Although the openings 40 are shown as being round holes, they may be any other shapes, such as rectangular, for example.

Figure 8:
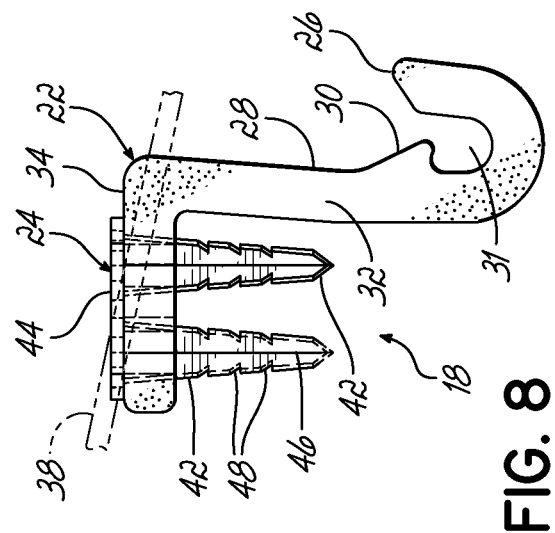
FIG. 8 is a side elevational view of the clip assembly of FIG. 6.
Figure 7:
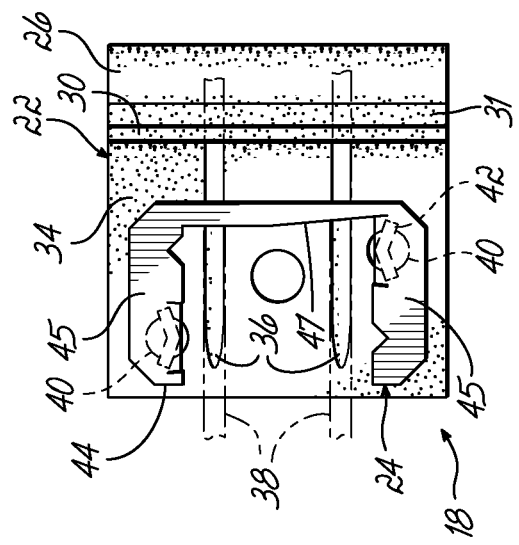
FIG. 7 is a top plan view of the clip assembly of FIG. 6.

As best shown in FIG. 6, the second piece 24 of clip assembly 18 has a pair of tacks 42 extending downwardly from a generally planar, generally U-shaped body portion 44 of the second piece 24 of clip assembly 18. More particularly, each of the tacks 42 extends downwardly from one of the sides 45 of the generally U-shaped body portion 44 of the second piece 24 of clip assembly 18. The sides 45 of the generally U-shaped body portion 44 of the second piece 24 of clip assembly 18 are connected by a connecting portion 47. The tacks 42 of the second piece 24 of clip assembly 18 are located and sized to pass through the openings 40 of the first piece 22 of clip assembly 18. Each of the tacks 42 of the second piece 24 of clip assembly 18 has a crease 46 therein so the tack 42 has a non-planar cross-section. More particularly, the cross-section of each tack 42 has a generally "V-shape", as shown in FIG. 5. As best shown in FIG. 8, each of the tacks 42 of the second piece 24 of clip assembly 18 also has a plurality of vertically spaced serrations or indentations 48 to improve the holding strength of the clip assembly 18 to the wooden furniture frame 12.

FIG. 6A illustrates an alternative clip assembly 18a having a first piece 22 identical to the one shown in FIG. 6 and a second piece 24a in which the tacks 24a are generally planar, lacking the crease and serrations 48 of each of the tacks 24 of the second piece 24 of clip assembly 18 shown in FIG. 6. As shown in FIG. 6A, each of the tacks 42a of second piece 24a of clip assembly 18a lacks the crease 46 and serrations 48 of each of the tacks 24 of the second piece 24 of clip assembly 18 shown in FIG. 6.

FIG. 6B illustrates an alternative clip assembly 18b having a first piece 22b slightly different than the first piece 22 shown in FIG. 6 and a second piece 24 identical to the second piece 24 of clip assembly 18 shown in FIG. 6. As shown in FIG. 6B, first piece 22b of clip assembly 18b lacks the openings 40 of the first piece 22 of clip assembly 18 shown in FIG. 6. In clip assembly 18b, the tacks 42 of the second piece 24 of clip assembly 18b may be driven through the material of the first piece 22b of clip assembly 18b. Alternatively, tacks like tacks 42a of the second piece 24a of clip assembly 18a may be used with a second piece of a clip assembly having no openings, in which case the tacks would be driven through the material of the first piece of the clip assembly. In any of the embodiments described or illustrated herein, the plastic or non-metallic piece of the clip assembly may lack openings, and the tacks of the metallic piece driven through the plastic or non-metallic material in order to secure the pieces of the clip assembly together.

As best illustrated in FIGS. 1, 2 and 2A, the tacks 42 of the second piece 24 of clip assembly 18 are secured inside one of the side walls 14 of furniture frame 12 with either an automated/mechanical machine or hand-held tool. When secured in place, the flange portion 34 of the first piece 22 of clip assembly 18 contacts or abuts an outer side surface 50 of one of the side walls 14 of furniture frame 12, and the body portion 28 of the first piece 22 of clip assembly 18 contacts or abuts an upper end surface 52 of one of the side walls 14 of furniture frame 12. As best shown in FIG. 2, the U-shaped hook portion 26 of the first piece 22 of clip assembly 18 is located generally above the inside side surface 54 of one of the side walls 14 of furniture frame 12.

FIG. 3 shows four clip assemblies 18 aligned in a similar orientation and having the flange portion 34 of the first piece 22 of clip assembly 18 contacting or proximate the body portion 28 of the first piece 22 of an adjacent clip assembly 18. When the clip assemblies are juxtaposed in such a manner, the grooves 36 of each clip assembly 18 are co-linearly aligned to permit a flexible connector 38 to be inserted into each of the aligned grooves 36 and extend the length of the aligned clip assemblies 18. As best shown in FIGS. 3-5, the two flexible connectors 38 are trapped or sandwiched between the first and second pieces 22, 24 of each clip assembly 18, each flexible connector being inside a plurality of aligned grooves 36 of multiple clip assemblies 18.

Although FIGS. 3-5 show four clip assemblies 18 aligned in a string 56 of aligned collated clip assemblies 18, the string 56 of aligned collated clip assemblies 18 may be made of any number of clip assemblies 18 connected together. In each of the aligned collated clip assemblies 18, the connectors 38 are trapped between the first and second pieces 22, 24 of the collated clip assembly 18.

The connectors 38 used to interconnect adjacent aligned clip assemblies 18 into a string 56 are preferably fabricated from a plastic material, such as a low density polyethylene or polyester plastic. The connectors 38 provide a flexibility in the collated string 56 of clip assemblies 18, which is needed when the string 56 is bent and rolled into a spool for insertion into a clinching tool. The connectors 38 have the required tensile strength to withstand pulling and twisting forces without breaking. Also, when a last clip assembly is cut off from the string 56, there are no sharp or jagged barbs left over to injure workers or tear fabric covering the clipped wires.

Figure 2C:
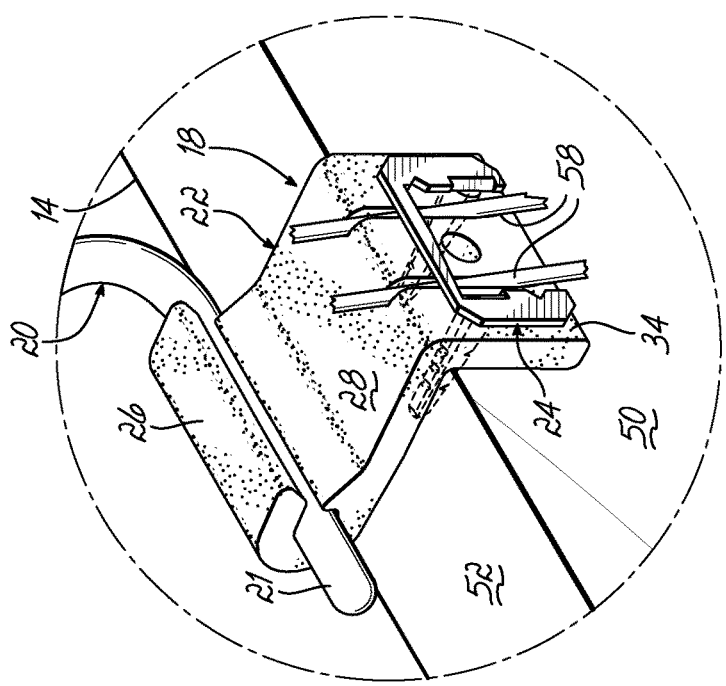
FIG. 2C is an enlarged view like the encircled area 2A showing pieces of connector secured to the clip assembly.
Figure 2B:
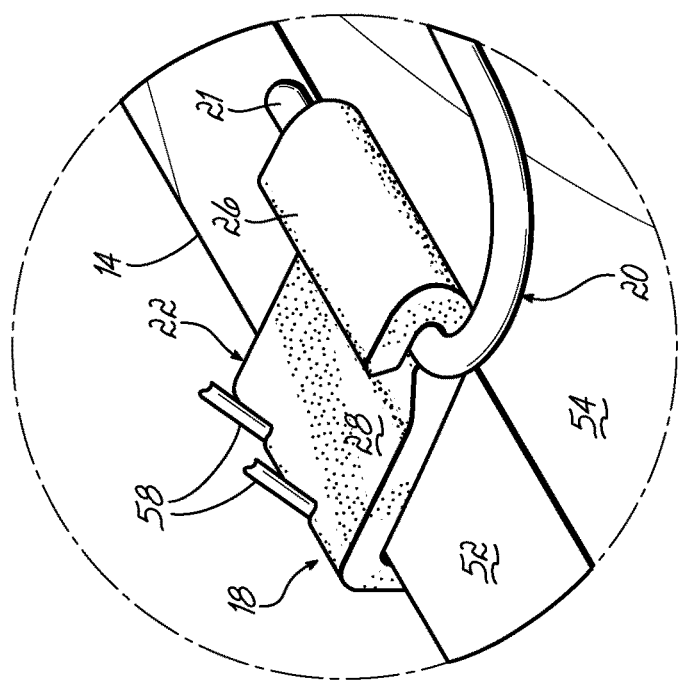
FIG. 2B is an enlarged view like the encircled area 2 showing pieces of connector secured to the clip assembly.

When used in a clipping tool, the connectors 38 may be broken between adjacent clip assemblies 18 in the collated string 56 of clip assemblies 18, leaving portions 58 of the connectors 38 with the clip assembly 18 secured to the frame 12. FIGS. 2B and 2C illustrate two such clip assemblies 18, each clip assembly 18 having portions 58 of the connectors 38 still with the clip assembly 18 when the clip assembly 18 is secured to one of the side walls 14 of frame 12.

Figure 3A:
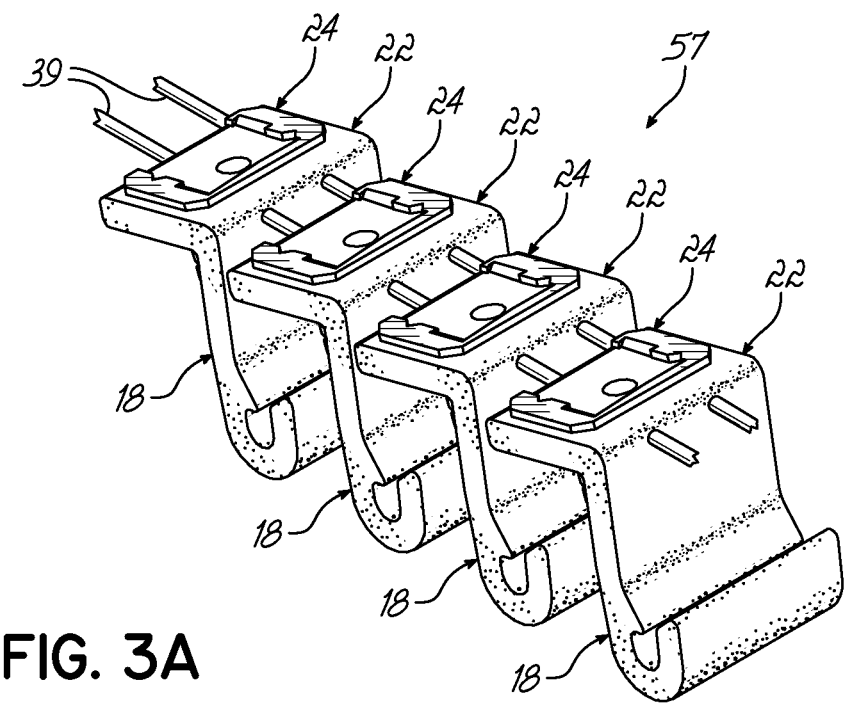
FIG. 3A is a perspective view of a portion of another collated string of clip assemblies.

FIG. 3A illustrates four clip assemblies 18 aligned in a string 57 of aligned collated clip assemblies. The string 57 of aligned collated clip assemblies 18 may be made of any number of clip assemblies 18 connected together using plastic or non-metallic connectors 39. In each of the aligned collated clip assemblies 18, connectors 39, made of the material of the second pieces 22 of clip assemblies 18, extend between the second pieces 22 of adjacent clip assemblies 18. Connectors 39 may be broken where desired in a clipping tool, manually or any other known manner to separate adjacent clip assemblies. This type of connection using the same plastic or non-metallic material of a clip assembly may be used in any embodiment shown or described herein.

Figure 9:
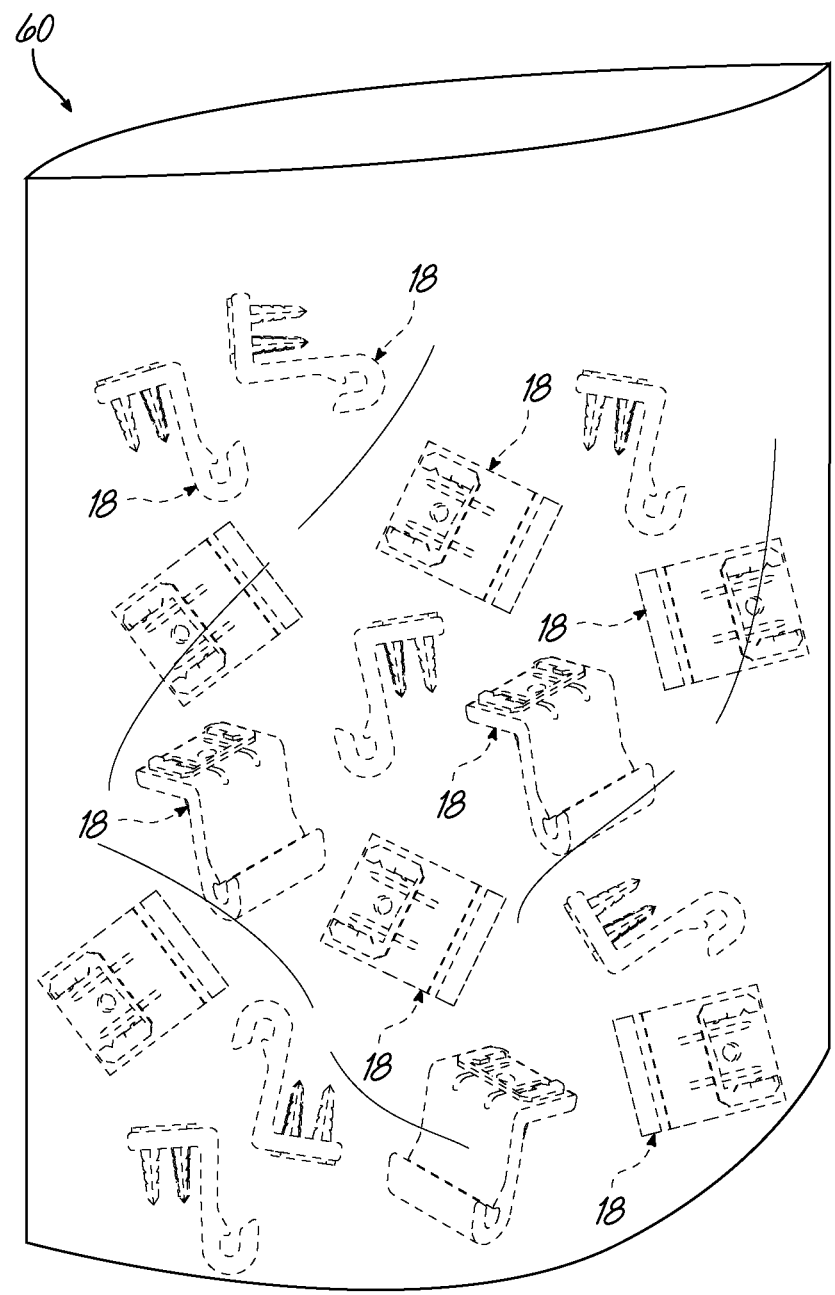
FIG. 9 is a perspective view of a bag or collection of clip assemblies.

FIG. 9 illustrates a package 60 of clip assemblies 18, which may be used to secure sinuous springs 20 to a frame 12, as described herein. However, in this embodiment of clip assembly 18, the second metallic piece 24 may or may not have any grooves. If the clip assemblies 18 lack the grooves, a plurality of such clip assemblies 18 may not be connected with flexible connectors 38, like clip assemblies 18. Therefore, the clip assemblies 18 may not be connected to each other and may be sold in a package 60 of individual clip assemblies.

Figure 10:
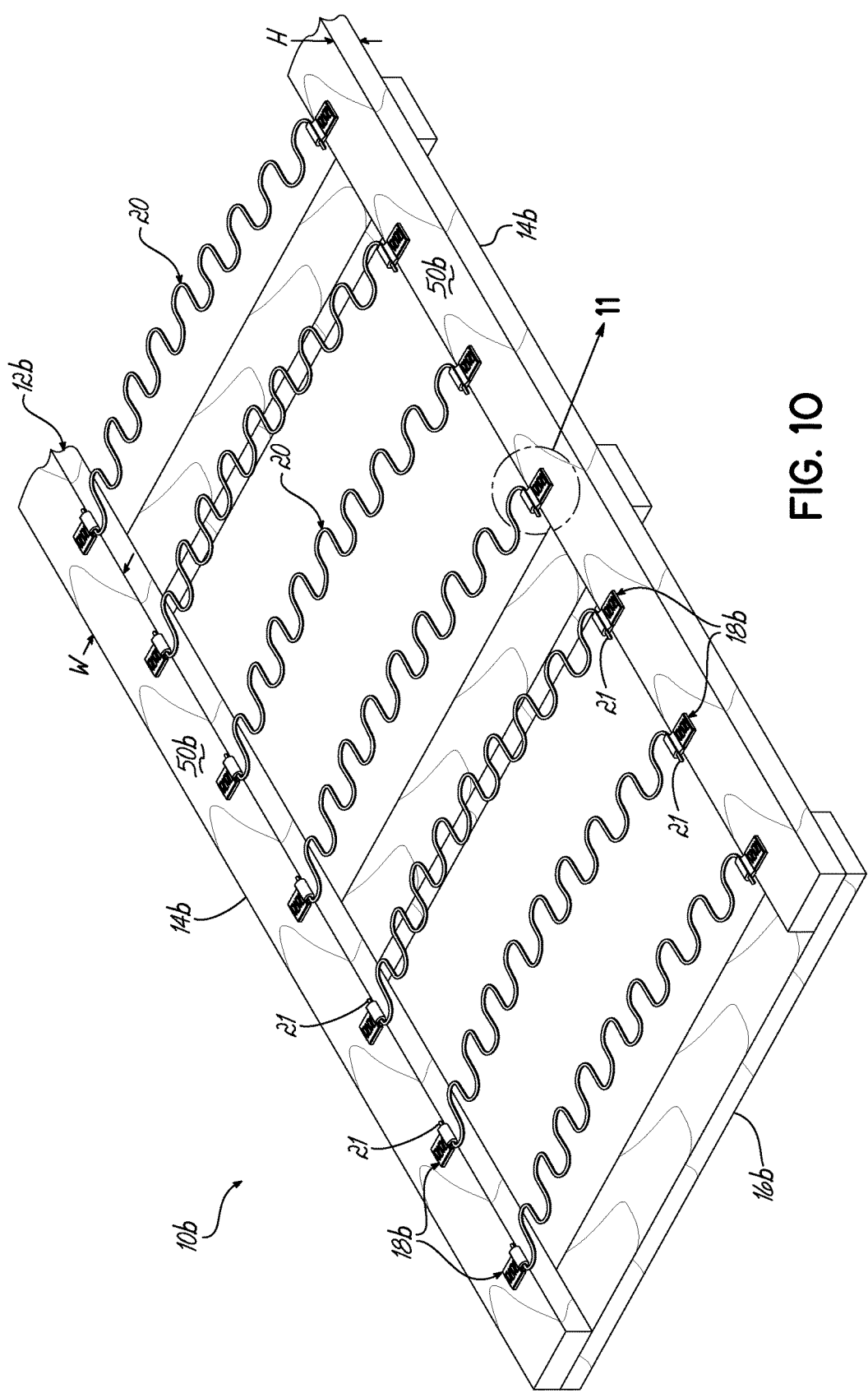
FIG. 10 is a perspective view of a frame and sinuous springs extending from one side to the other side of the frame, clip assemblies in accordance with another embodiment being secured to the frame sides, similar to FIG. 1.

FIG. 10 illustrates a portion of a piece of furniture 10$b$ comprising a rectangular frame 12$b$ comprising two side walls 14$b$ and two end walls 16$b$ (only one being shown in FIG. 10). The frame 12$b$ is most commonly made of wood, but may be made of other suitable materials. In the embodiment of frame 12$b$ shown in FIG. 10, each of the side and end walls 14$b$, 16$b$, respectively, is oriented such that the width "W" of each wall 14$b$, 16$b$ is greater than its height "H".

As shown in FIG. 10, furniture piece 10$b$ further comprises a plurality of clip assemblies 18$b$ secured to the side walls 14$b$ of the frame 12$b$ in a spaced manner for securing and retaining a plurality of sinuous springs 20. Clip assemblies 18$b$, secured to opposed side walls 14$b$, are aligned to receive and retain end portions 21 of sinuous springs 20 in desired positions and under desired amounts of tension, as shown in FIG. 10. Commonly, such sinuous springs 20 are arched or bowed upwardly to provide resiliency to the furniture piece 10.

Figure 11A:
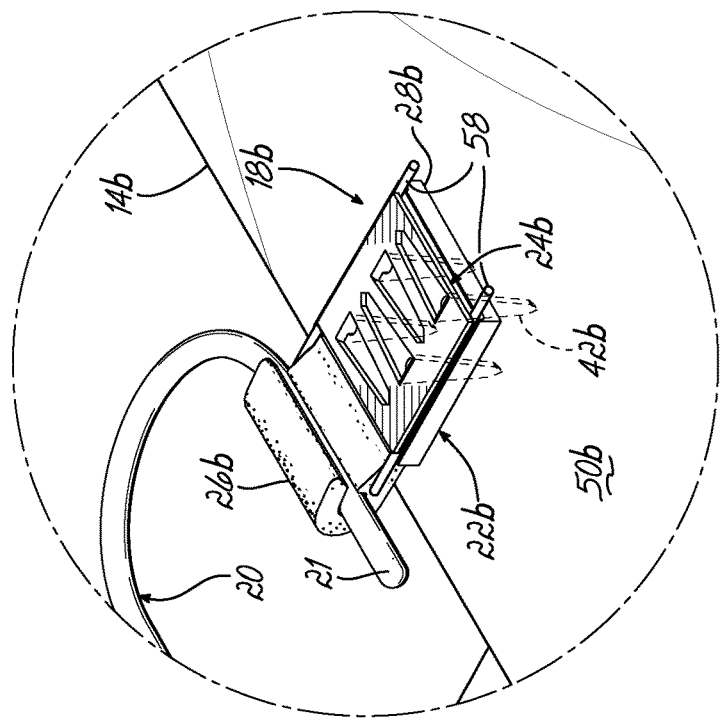
FIG. 11A is an enlarged view, similar to FIG. 11, of the clip assembly of FIG. 11 showing pieces of connector secured to the clip assembly.
Figure 11:
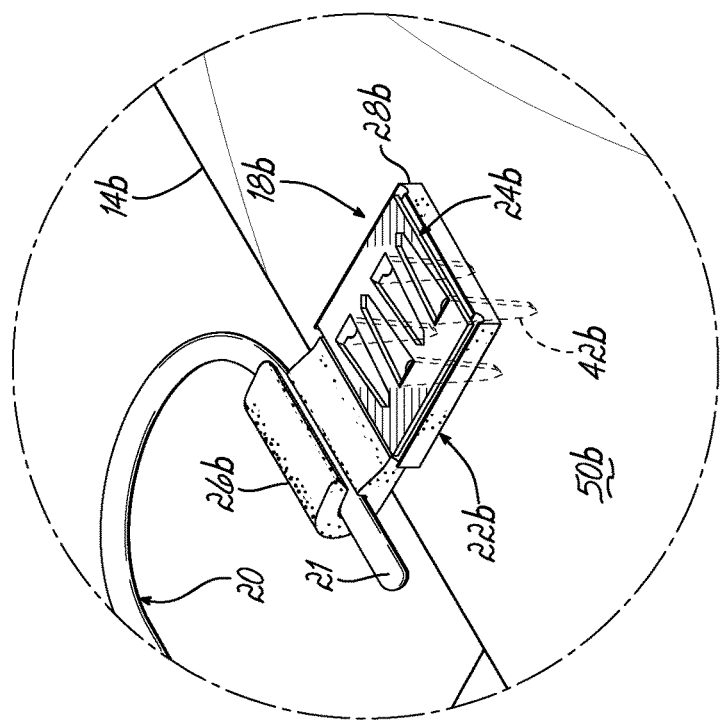
FIG. 11 is an enlarged view of the encircled area 11 of FIG. 10.

FIGS. 11 and 11A each show one of the clip assemblies 18$b$ secured to one of the side walls 14$b$ of frame 12$b$. As best shown in FIG. 15, each clip assembly 18$b$ comprises a first non-metallic piece 22$b$, usually made of plastic, and a second metal piece 24$b$, respectively. The pieces 22$b$, 24$b$ are joined together and secured to one of the side walls 14$b$ of the generally rectangular furniture frame 12$b$.

As best shown in FIG. 15, the first piece 22$b$ of clip assembly 18$b$ comprises a U-shaped hook portion 26$b$ adapted to receive and retain an end portion 21 of one of the sinuous springs 20. The first piece 22$b$ of clip assembly 18$b$ further comprises a generally planar body portion 28$b$, which includes a ledge 30$b$ extending from one side edge 32$b$ to the opposed side edge 32$b$ of the body portion 28$b$ of the first piece 22$b$ of the clip assembly 18$b$. When the end portion 21 of one of the sinuous springs 20 is inserted into the U-shaped hook portion 26$b$, the ledge 30$b$ of the body portion 28$b$ holds or retains the end portion 21 of the sinuous spring 20 in a receptacle 31$b$, illustrated in FIG. 17. As best shown in FIG. 15A, the body portion 28$b$ of the first piece 22$b$ of clip assembly 18$b$ has a pair of spaced grooves 36$b$ along the outer periphery of the body portion 16$b$, each of the grooves 36$b$ being adapted to receive a non-metallic connector 38. Two connectors 38 connect multiple clip assemblies 18$b$ together, as shown in FIGS. 12-14.

As shown in FIG. 15, the body portion 28$b$ of the first piece 22$b$ of clip assembly 18$b$ has four openings 40$b$, each opening 40$b$ extending through the thickness of the body portion 28$b$ of the first piece 22$b$ of clip assembly 18$b$. As best shown in FIG. 15, the second piece 24$b$ of clip assembly 18$b$ has four tacks 42$b$ extending downwardly from a generally planar, generally body portion 44$b$ of the second piece 24$b$ of clip assembly 18$b$. More particularly, each of the tacks 42$b$ is formed from material from the body portion 44$b$ of the second piece 24$b$ of clip assembly 18$b$ using a punch press. The tacks 24$b$ initially lie in the plane of the body portion 44$b$ and are bent downwardly out of the plane, thereby leaving four openings 62 in the body portion 44$b$ of the second piece 24$b$ of clip assembly 18$b$. The tacks 42$b$ of the second piece 24$b$ of clip assembly 18$b$ are located and sized to pass through the openings 40$b$ of the first piece 22$b$ of clip assembly 18$b$. Each of the tacks 42$b$ of the second piece 24$b$ of clip assembly 12 is generally planar, lacking the crease and serrations of the tacks 42$c$ of the second piece 24$c$ of clip assembly 18$c$, shown in FIG. 15A.

FIG. 15A illustrates an alternative clip assembly 18$c$ having a first piece 22$b$ identical to the one shown in FIG. 15 and a second piece 24$c$ in which the tacks 42$c$ has a crease 46 therein so the tack 42$c$ has a non-planar cross-section. More particularly, the cross-section of each tack 42$c$ has a generally "V-shape", as shown in FIG. 15A. As best shown in FIG. 15A, each of the tacks 42$c$ of the second piece 24$c$ of clip assembly 18$c$ also has a plurality of serrations or indentations 48 to improve the holding strength of the clip assembly 18$c$ to the wooden furniture frame.

As best illustrated in FIGS. 10, 11 and 11A, the tacks 42$b$ of the second piece 24$b$ of clip assembly 18$b$ are secured inside one of the side walls 14$b$ of furniture frame 12$b$ with a clipping tool (not shown). When secured in place, the body portion 28$b$ of the first piece 22$b$ of clip assembly 18$b$ contacts or abuts an upper side surface 50$b$ of one of the side walls 14$b$ of furniture frame 12$b$. As best shown in FIGS. 11 and 11$b$, the U-shaped hook portion 26$b$ of the first piece 22$b$ of clip assembly 18$b$ is located generally towards the interior of the rectangular frame 12$b$.

FIG. 12 shows four clip assemblies 18$b$ aligned in a similar orientation and having the body portion 28$b$ of the first piece 22$b$ of a clip assembly 18$b$ contacting or proximate the U-shaped hook portion 26$b$ of the first piece 22$b$ of an adjacent clip assembly 18$b$. When the clip assemblies 18$b$ are juxtaposed in such a manner, the grooves 36$b$ of each clip assembly 18$b$ are co-linearly aligned to permit a flexible connector 38 to be inserted into each of the aligned grooves 36$b$ and extend the length of the aligned clip assemblies 18$b$. As best shown in FIGS. 12-14, the two flexible connectors 38 are trapped or sandwiched between the first and second pieces 22$b$, 24$b$ of each clip assembly 18$b$, each flexible connector 38 being inside a plurality of aligned grooves 36$b$ of multiple clip assemblies 18$b$.

Although FIGS. 12-14 show four clip assemblies 18$b$ aligned in a string 56$b$ of aligned collated clip assemblies 18$b$, the string 56$b$ of aligned collated clip assemblies 18$b$ may be made of any number of clip assemblies 18$b$ connected together.

The connectors 38 used to interconnect adjacent aligned clip assemblies 18$b$ into a string 56$b$ are preferably fabricated from a plastic material, such as a low density polyethylene or polyester plastic. The connectors 38 provide a flexibility in the collated string 56$b$ of clip assemblies 18$b$, which is needed when the string 56$b$ is bent and rolled into a spool for insertion into a clipping tool. The connectors 38 have the required tensile strength to withstand pulling and twisting forces without breaking. Also, when a last clip assembly is cut off from the string 56$b$, there are no sharp or jagged barbs left over to injure workers or tear fabric covering the clipped wires.

When used in a clipping tool, the connectors 38 may be broken between adjacent clip assemblies 18$b$ in the collated string 56$b$ of clip assemblies 18$b$, leaving portions 58 of the connectors 38 with the clip assembly 18$b$ secured to the frame 12$b$. FIG. 11A illustrates one such clip assembly 18$b$, each clip assembly 18$b$ having portions 58 of the connectors 38 still with the clip assembly 18b when the clip assembly 18b is secured to one of the side walls 14b of frame 12b.

Figure 12A:
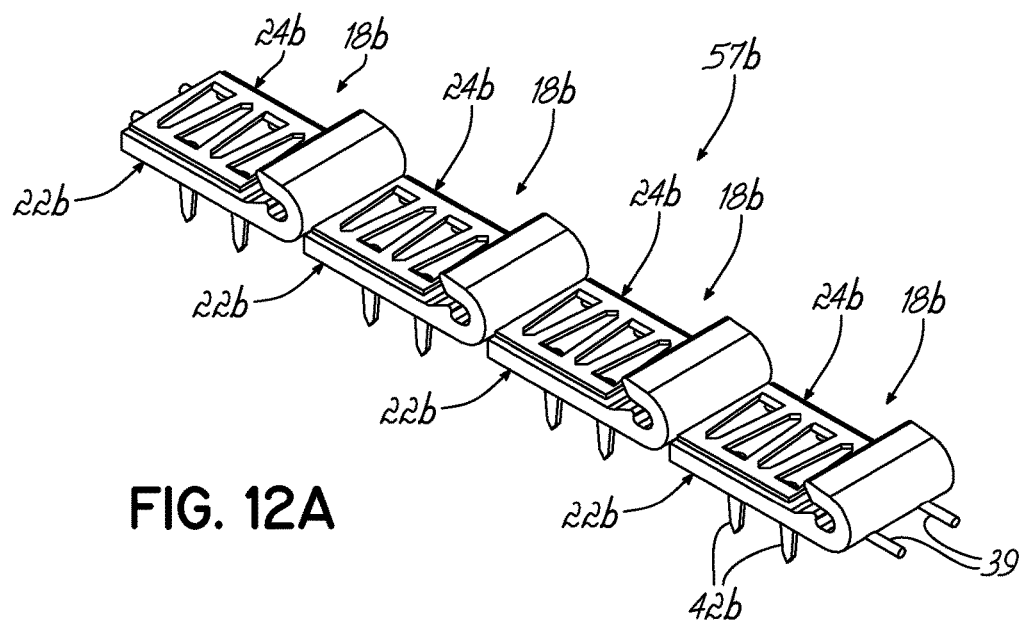
FIG. 12A is a perspective view of a portion of another collated string of clip assemblies.

FIG. 12A illustrates four clip assemblies 18b aligned in a string 57b of aligned collated clip assemblies. The string 57b of aligned collated clip assemblies 18b may be made of any number of clip assemblies 18b connected together using connectors 39. In each of the aligned collated clip assemblies 18b, connectors 39, made of the same material of the second pieces 22b of clip assemblies 18b, extend between the second pieces 22b of adjacent clip assemblies 18b. Connectors 39 may be broken where desired in a clipping tool, manually or in any known manner.

Figure 18:
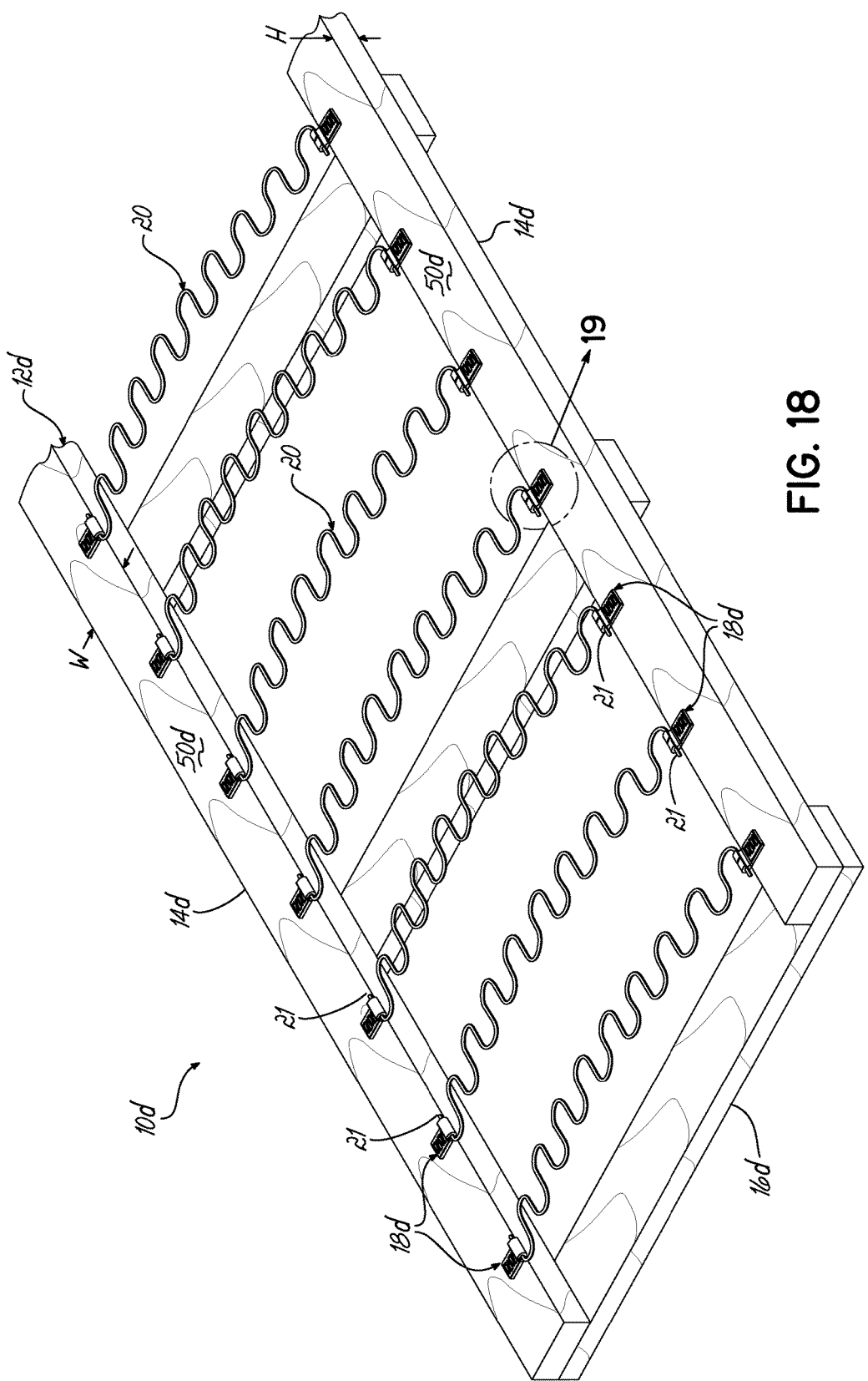
FIG. 18 is a perspective view of a furniture frame and sinuous springs extending from one side to the other side of the frame, clip assemblies in accordance with another embodiment being secured to the frame sides, similar to FIG. 10.

FIG. 18 illustrates a portion of a piece of furniture 10d comprising a rectangular frame 12d comprising two side walls 14d and two end walls 16d (only one being shown in FIG. 18). The frame 12d is most commonly made of wood, but may be made of other suitable materials. In the embodiment of frame 12d shown in FIG. 18, each of the side and end walls 14d, 16d, respectively, is oriented such that the width "W" of each wall 14d, 16d is greater than its height "H".

As shown in FIG. 18, furniture piece 10d further comprises a plurality of clip assemblies 18d secured to the side walls 14d of the frame 12d in a spaced manner for securing and retaining a plurality of sinuous springs 20. Clip assemblies 18d, secured to opposed side walls 14d, are aligned to receive and retain end portions 21 of sinuous springs 20 in desired positions and under a desired amount of tension, as shown in FIG. 18. Commonly, such sinuous springs 20 are arched or bowed upwardly to provide resiliency to the furniture piece 10d.

Figure 19A:
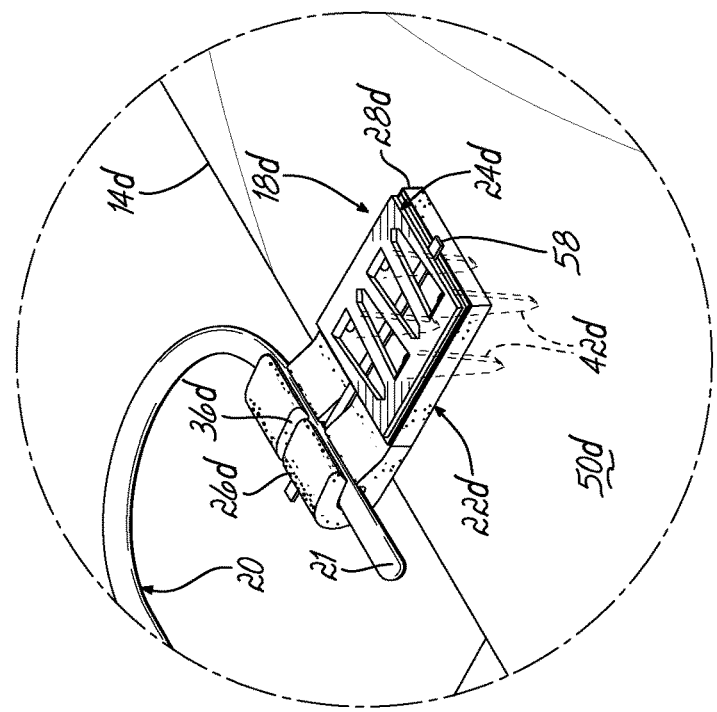
FIG. 19A is an enlarged view, similar to FIG. 19, of the clip assembly of FIG. 19 showing a piece of connector secured to the clip assembly.
Figure 19:
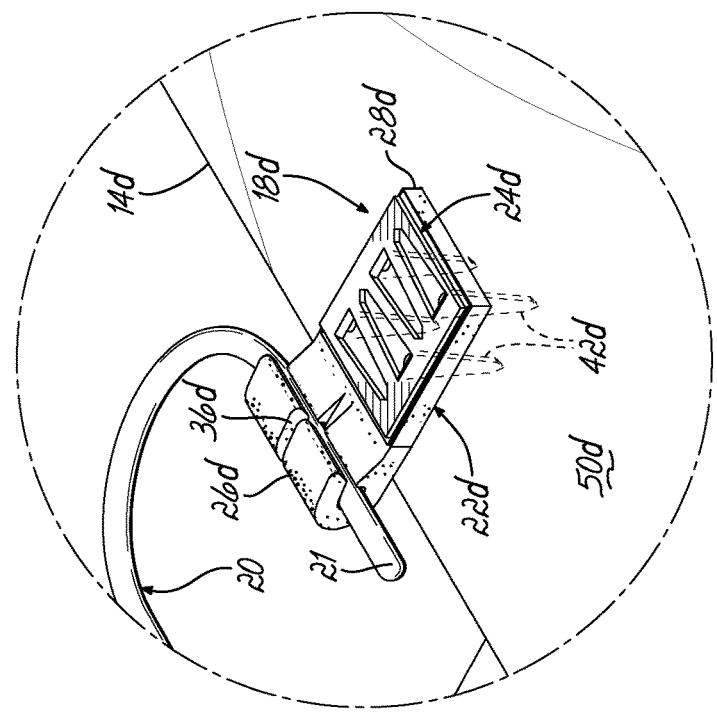
FIG. 19 is an enlarged view of the encircled area 19 of FIG. 18.

FIGS. 19 and 19A each show one of the clip assemblies 18d secured to one of the side walls 14b of frame 12b. As best shown in FIG. 23, each clip assembly 18d comprises a first non-metallic piece 22d, usually made of plastic, and a second metal piece 24d, respectively. The pieces 22d, 24d are joined together and secured to one of the side walls 14d of the generally rectangular furniture frame 12d.

As shown in FIG. 23, the first piece 22d of clip assembly 18d comprises a U-shaped hook portion 26d adapted to receive and retain an end portion 21 of one of the sinuous springs 20. The first piece 22d of clip assembly 18d further comprises a generally planar body portion 28d, which includes a ledge 30d extending from one side edge 32d to the opposed side edge 32d of the body portion 28d of the first piece 22d of the clip assembly 18d. When the end portion 21 of one of the sinuous springs 20 is inserted into the U-shaped hook portion 26d, the ledge 30d of the body portion 28d holds or retains the end portion 21 of the sinuous spring 20 in a receptacle 31d, illustrated in FIG. 25. As best shown in FIG. 23, the U-shaped hook portion 26d of the first piece 22d of clip assembly 18d has a groove 36d extending inwardly from the outer surface of the U-shaped hook portion 26d, the groove 36d being adapted to receive a non-metallic connector 38. One connector 38 connects multiple clip assemblies 18d together, as shown in FIGS. 20-22.

As shown in FIG. 23, the body portion 28d of the first piece 22d of clip assembly 18d has four openings 40d, each opening 40d extending through the thickness of the body portion 28d of the first piece 22d of clip assembly 18d. As best shown in FIG. 23, the second piece 24d of clip assembly 18d has four tacks 42d extending downwardly from a generally planar, generally body portion 44d of the second piece 24d of clip assembly 18d. More particularly, each of the tacks 42d is formed from material from the body portion 44d of the second piece 24d of clip assembly 18d using a punch press. The tacks 24d initially lie in the plane of the body portion 44d and are bent downwardly out of the plane, thereby leaving four openings 62 in the body portion 44d of the second piece 24d of clip assembly 18d. The tacks 42d of the second piece 24d of clip assembly 18b are located and sized to pass through the openings 40d of the first piece 22d of clip assembly 18d. Each of the tacks 42d of the second piece 24d of clip assembly 12 are generally planar, lacking the crease and serrations of the tacks 42c of the second piece 24c of clip assembly 18c, shown in FIG. 15A. However, the tacks 42d of the second piece 24d of clip assembly 18d may have creases or serrations, as illustrated and described herein.

As best illustrated in FIGS. 18, 19 and 19A, the tacks 42d of the second piece 24d of clip assembly 18d are secured inside one of the side walls 14d of furniture frame 12d with a clipping tool (not shown). When secured in place, the body portion 28d of the first piece 22d of clip assembly 18d contacts or abuts an upper side surface 50d of one of the side walls 14d of furniture frame 12d. As best shown in FIGS. 19 and 19A, the U-shaped hook portion 26d of the first piece 22d of clip assembly 18d is located generally towards the interior of the rectangular frame 12d.

FIG. 20 shows four clip assemblies 18d aligned in a similar orientation and having the body portion 28d of the first piece 22d of a clip assembly 18d contacting or proximate the U-shaped hook portion 26d of the first piece 22d of an adjacent clip assembly 18d. When the clip assemblies 18d are juxtaposed in such a manner, the groove 36d of each clip assembly 18b is co-linearly aligned to permit a flexible connector 38 to be inserted into the aligned grooves 36d and extend the length of the aligned clip assemblies 18d. As best shown in FIGS. 20-22, the flexible connector 38 is trapped or sandwiched between the first and second pieces 22d, 24d of each clip assembly 18d, each flexible connector 38 being inside a plurality of aligned grooves 36d of multiple clip assemblies 18d.

Although FIGS. 20-22 show four clip assemblies 18d aligned in a string 56d of aligned collated clip assemblies 18d, the string 56d of aligned collated clip assemblies 18d may be made of any number of clip assemblies 18d connected together.

The connector 38 used to interconnect adjacent aligned clip assemblies 18d into a string 56d is preferably fabricated from a plastic material, such as a low density polyethylene or polyester plastic. The connector 38 provides flexibility in the collated string 56d of clip assemblies 18d, which is needed when the string 56d is bent and rolled into a spool for insertion into a clipping tool. The connector 38 has the required tensile strength to withstand pulling and twisting forces without breaking. Also, when a last clip assembly is cut off from the string 56d, there are no sharp or jagged barbs left over to injure workers or tear fabric covering the clipped wires.

When used in a clipping tool, the connector 38 may be broken between adjacent clip assemblies 18d in the collated string 56d of clip assemblies 18d, leaving portions 58 of the connector 38 with the clip assembly 18d secured to the frame 12d. FIG. 19A illustrates one such clip assembly 18d, each clip assembly 18d having portions 58 of the connector 38 still with the clip assembly 18d when the clip assembly 18d is secured to one of the side walls 14d of frame 12d.

Figure 26:
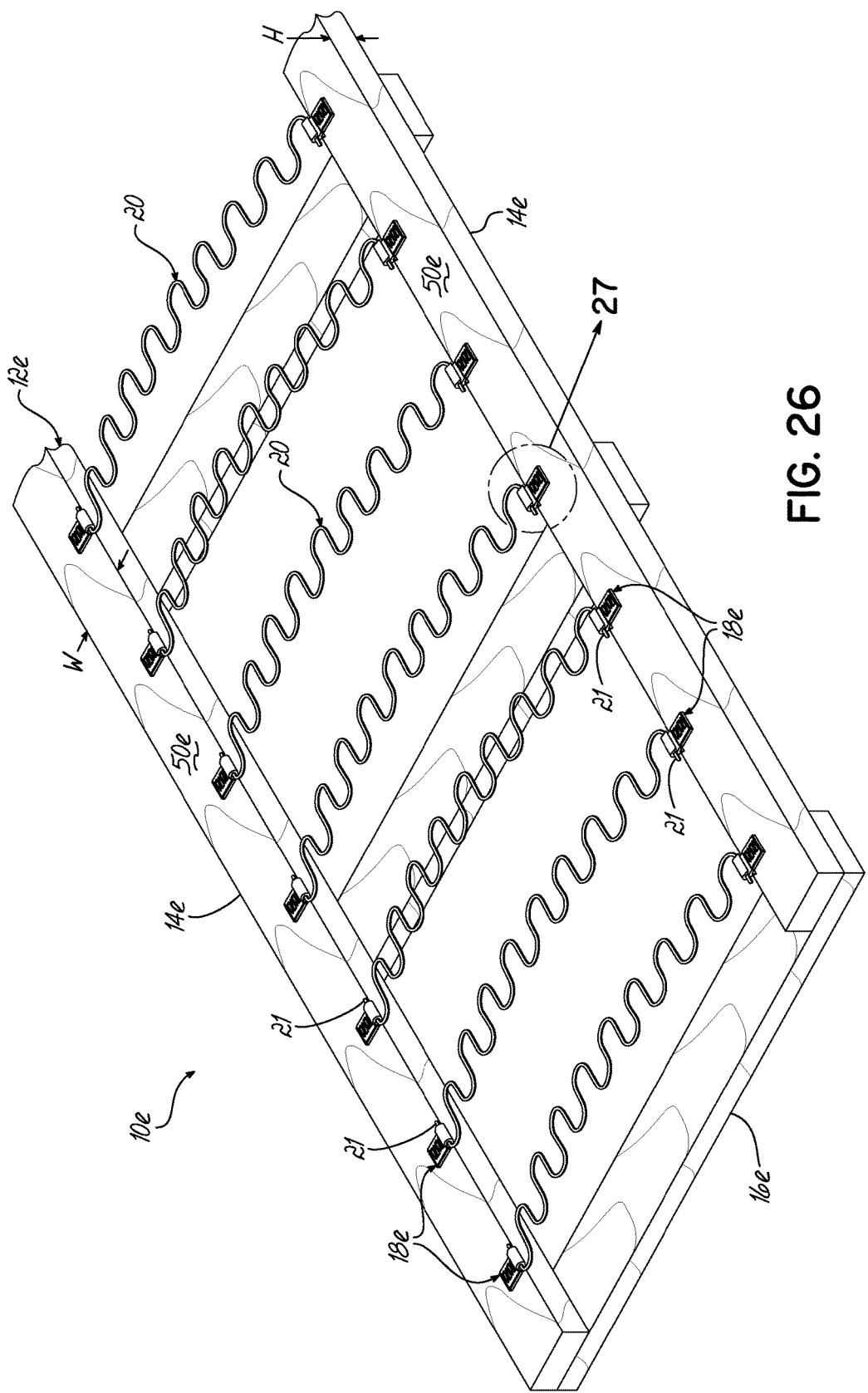
FIG. 26 is a perspective view of a furniture frame and sinuous springs extending from one side to the other side of the frame, clip assemblies in accordance with another embodiment being secured to the frame sides, similar to FIG. 18.

FIG. 26 illustrates a portion of a piece of furniture 10e comprising a rectangular frame 12e comprising two side walls 14e and two end walls 16e (only one being shown in FIG. 26). The frame 12e is most commonly made of wood, but may be made of other suitable materials. In the embodiment of frame 12e shown in FIG. 26, each of the side and end walls 14e, 16e, respectively, is oriented such that the width "W" of each wall 14e, 16e is greater than its height "H".

As shown in FIG. 26, furniture piece 10e further comprises a plurality of clip assemblies 18e secured to the side walls 14e of the frame 12e in a spaced manner for securing and retaining a plurality of sinuous springs 20. Clip assemblies 18e, secured to opposed side walls 14e, are aligned to receive and retain an end portion 21 of a sinuous spring 20 in a desired position and under a desired amount of tension, as shown in FIG. 26. Commonly, such sinuous springs 20 are arched or bowed upwardly to provide resiliency to the furniture piece 10e.

Figure 27A:
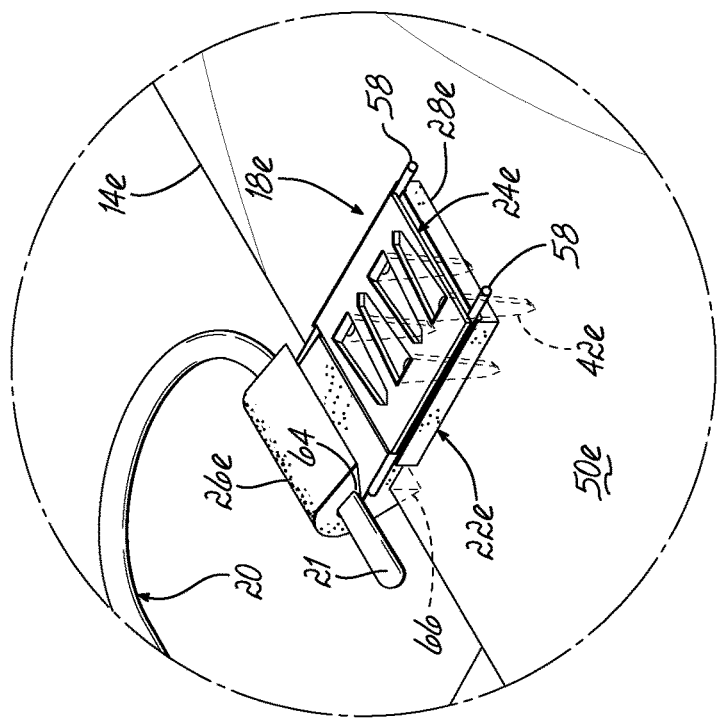
FIG. 27A is an enlarged view, similar to FIG. 27, of the clip assembly of FIG. 26 showing pieces of connectors secured to the clip assembly.
Figure 27:
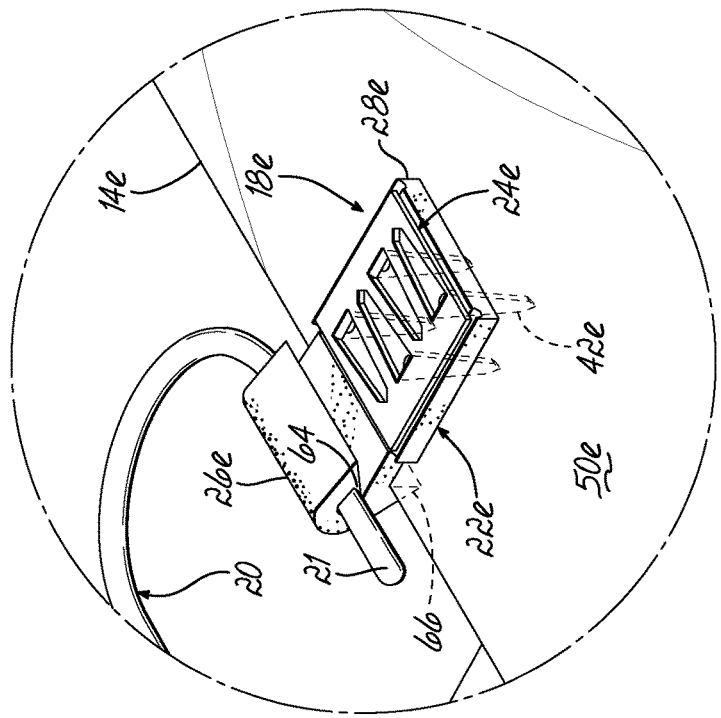
FIG. 27 is an enlarged view of the encircled area 27 of FIG. 26.

FIGS. 27 and 27A each show one of the clip assemblies 18e secured to one of the side walls 14e of frame 12e. As best shown in FIG. 31, each clip assembly 18e comprises a first non-metallic piece 22e, usually made of plastic, and a second metal piece 24e, respectively. The pieces 22e, 24e are joined together and secured to one of the side walls 14e of the generally rectangular furniture frame 12e.

Figure 29:
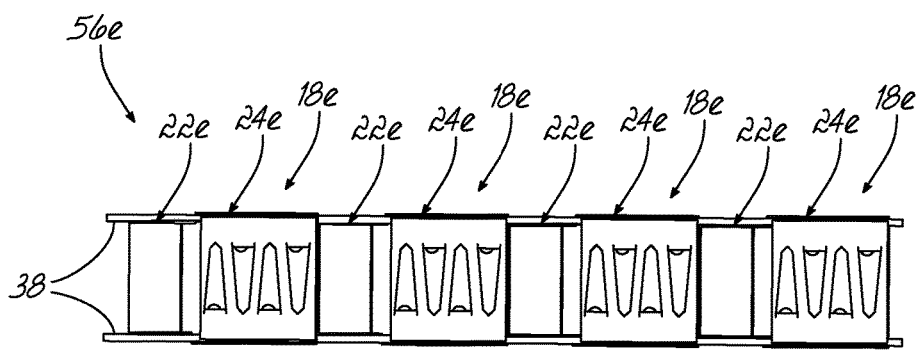
FIG. 29 is a top plan view of the portion of the collated string of clip assemblies of FIG. 28.
Figure 30:
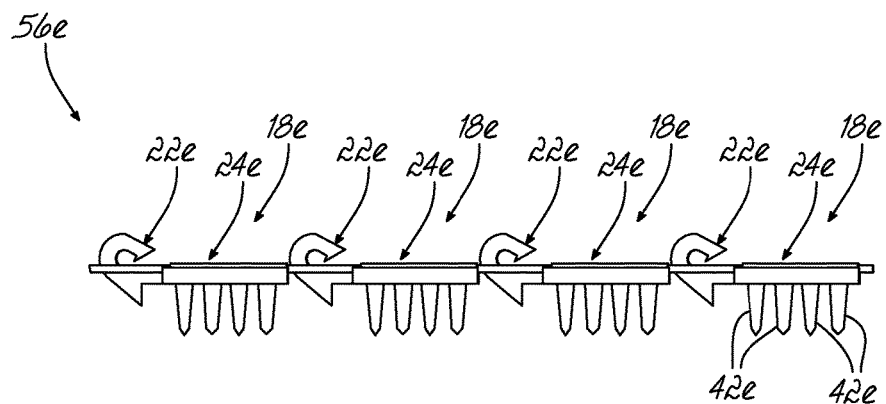
FIG. 30 is a side elevational view of the portion of the collated string of clip assemblies of FIG. 28.

The first piece 22e of clip assembly 18e comprises a U-shaped hook portion 26e adapted to receive and retain an end portion 21 of one of the sinuous springs 20 having an end ledge 64. The first piece 22e of clip assembly 18e further comprises a generally planar body portion 28e, which includes a stop 66 extending from one side edge 32e to the opposed side edge 32e of the body portion 28e of the first piece 22e of the clip assembly 18e. When the end portion 21 of one of the sinuous springs 20 is inserted into the U-shaped hook portion 26e, the stop 66 of the body portion 28e abuts the frame 12e, as shown in FIG. 27. The U-shaped hook portion 26e holds or retains the end portion 21 of the sinuous spring 20 in a receptacle 31e, illustrated in FIG. 27. As best shown in FIG. 27A, the body portion 28e of the first piece 22e of clip assembly 18e has a pair of spaced grooves 36e along the outer periphery of the body portion 28e, each of the grooves 36e being adapted to receive a non-metallic connector 38. Two connectors 38 connect multiple clip assemblies 18e together, as shown in FIGS. 28-30.

As shown in FIG. 27, the body portion 28e of the first piece 22e of clip assembly 18e has four openings 40e, each opening 40e extending through the thickness of the body portion 28e of the first piece 22e of clip assembly 18e. As best shown in FIG. 27, the second piece 24e of clip assembly 18e has four tacks 42e extending downwardly from a generally planar, generally body portion 44e of the second piece 24e of clip assembly 18e. More particularly, each of the tacks 42e is formed from material from the body portion 44e of the second piece 24e of clip assembly 18e, using a punch press. The tacks 24e initially lie in the plane of the body portion 44e and are bent downwardly out of the plane, thereby leaving four openings 62 in the body portion 44e of the second piece 24e of clip assembly 18e. The tacks 42e of the second piece 24e of clip assembly 18e are located and sized to pass through the openings 40e of the first piece 22e of clip assembly 18e. Each of the tacks 42e of the second piece 24e of clip assembly 12 is generally planar, lacking the crease of the tacks 42c of the second piece 24c of clip assembly 18c shown in FIG. 15A. However, the tacks 42e of the second piece 24e of clip assembly 18e may have creases or serrations, as illustrated and described herein.

As best illustrated in FIGS. 26, 27 and 27A, the tacks 42e of the second piece 24e of clip assembly 18e are secured inside one of the side walls 14e of furniture frame 12e with a clipping tool (not shown). When secured in place, the body portion 28e of the first piece 22e of clip assembly 18e contacts or abuts an upper side surface 50e of one of the side walls 14e of furniture frame 12e. As best shown in FIGS. 27 and 27A, the U-shaped hook portion 26e of the first piece 22e of clip assembly 18e is located generally towards the interior of the rectangular frame 12e.

Figure 28:
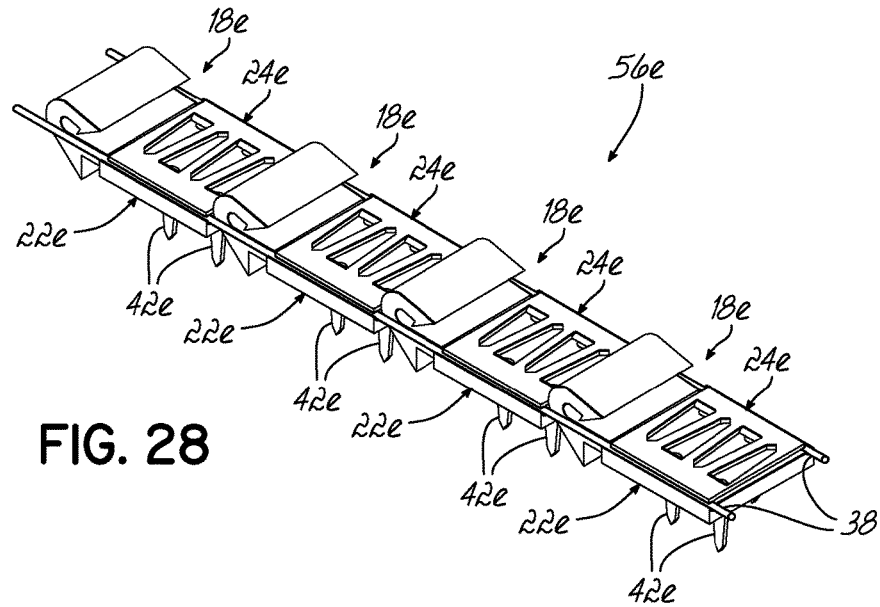
FIG. 28 is a perspective view of a portion of a collated string of clip assemblies of FIG. 26.

FIG. 28 shows four clip assemblies 18e aligned in a similar orientation and having the body portion 28e of the first piece 22e of a clip assembly 18e contacting or proximate the U-shaped hook portion 26e of the first piece 22e of an adjacent clip assembly 18e. When the clip assemblies 18e are juxtaposed in such a manner, the grooves 36e of each clip assembly 18e are co-linearly aligned to permit a flexible connector 38 to be inserted into each of the aligned grooves 36 and extend the length of the aligned clip assemblies 18e. As best shown in FIGS. 28-30, the two flexible connectors 38 are trapped or sandwiched between the first and second pieces 22e, 24e of each clip assembly 18e, each flexible connector 38 being inside a plurality of aligned grooves 36e of multiple clip assemblies 18e.

Although FIGS. 28-30 show four clip assemblies 18e aligned in a string 56e of aligned collated clip assemblies 18e, the string 56e of aligned collated clip assemblies 18e may be made of any number of clip assemblies 18e connected together.

The connectors 38 used to interconnect adjacent aligned clip assemblies 18e into a string 56e are preferably fabricated from a plastic material, such as a low density polyethylene or polyester plastic. The connectors 38 provide flexibility in the collated string 56e of clip assemblies 18e, which is needed when the string 56e is bent and rolled into a spool for insertion into a clipping tool. The connectors 38 have the required tensile strength to withstand pulling and twisting forces without breaking. Also, when a last clip assembly is cut off from the string 56e, there are no sharp or jagged barbs left over to injure workers or tear fabric covering the clipped wires.

When used in a clipping tool, the connectors 38 may be broken between adjacent clip assemblies 18e in the collated string 56e of clip assemblies 18e, leaving portions 58 of the connectors 38 with the clip assembly 18e secured to the frame 12e. FIG. 27A illustrates one such clip assembly 18e, each clip assembly 18e having portions 58 of the connectors 38 still with the clip assembly 18e when the clip assembly 18e is secured to one of the side walls 14e of frame 12e.

Figure 34:
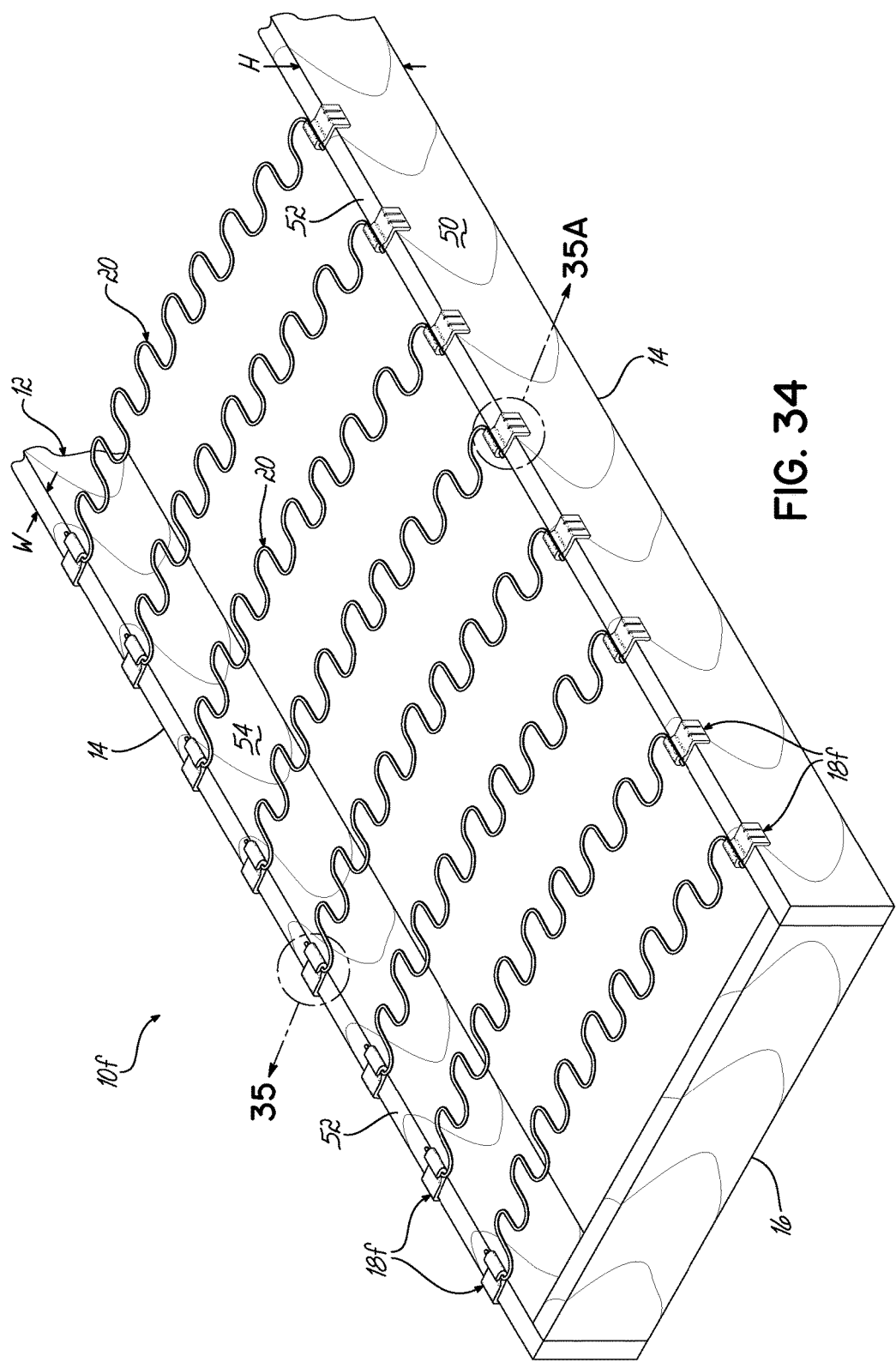
FIG. 34 is a perspective view of a furniture frame and sinuous springs extending from one side to the other side of the frame, clip assemblies in accordance with one embodiment being secured to the frame sides.

FIG. 34 illustrates a portion of a piece of furniture 10f comprising a rectangular frame 12 comprising two side walls 14 and two end walls 16 (only one being shown in FIG. 34). The frame 12 is the same frame illustrated in FIG. 1.

As shown in FIG. 34, furniture piece 10f further comprises a plurality of clip assemblies 18f secured to the side walls 14 of the frame 12 in a spaced manner for securing and retaining a plurality of sinuous springs 20. Clip assemblies 18f, secured to opposed side walls 14, are aligned to receive and retain end portions 21 of sinuous springs 20 in desired positions and under desired amounts of tension, as shown in FIG. 34. Commonly, such sinuous springs 20 are arched or bowed upwardly to provide resiliency to the furniture piece 10f.

Figure 35A:
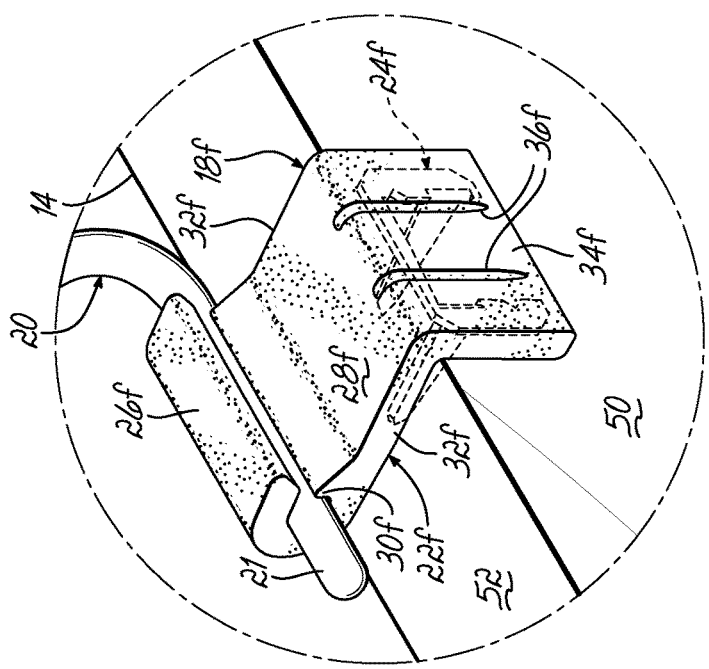
FIG. 35A is an enlarged view of the encircled area 35A of FIG. 34.
Figure 35:
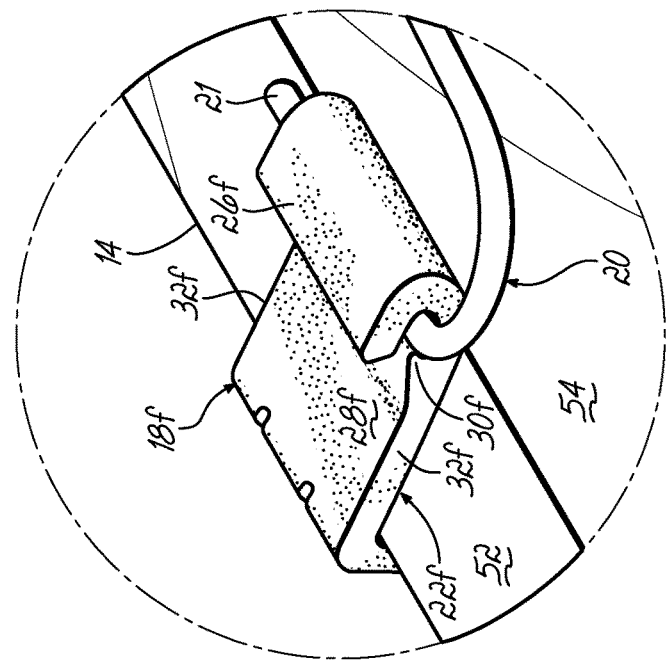
FIG. 35 is an enlarged view of the encircled area 35 of FIG. 34.

FIGS. 35 and 35A each show one of the clip assemblies 18f secured to one of the side walls 14 of frame 12. As best shown in FIG. 35A, each clip assembly 18f comprises a first non-metallic piece or clip 22f, usually made of plastic, and a second metal piece or fastener 24f molded together into a unitary member. Each clip assembly 18f is secured to one of the side walls 14 of the generally rectangular furniture frame 12, with the tacks or projections 42f of the clip assembly 18f being embedded in the frame side wall 14.

Figure 36:
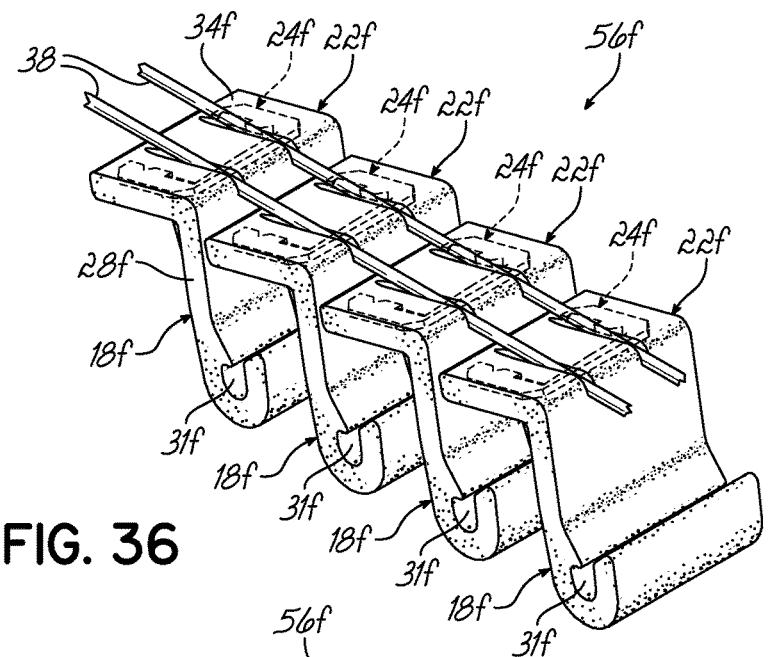
FIG. 36 is a perspective view of a portion of a collated string of clip assemblies of FIG. 34.
Figure 37:
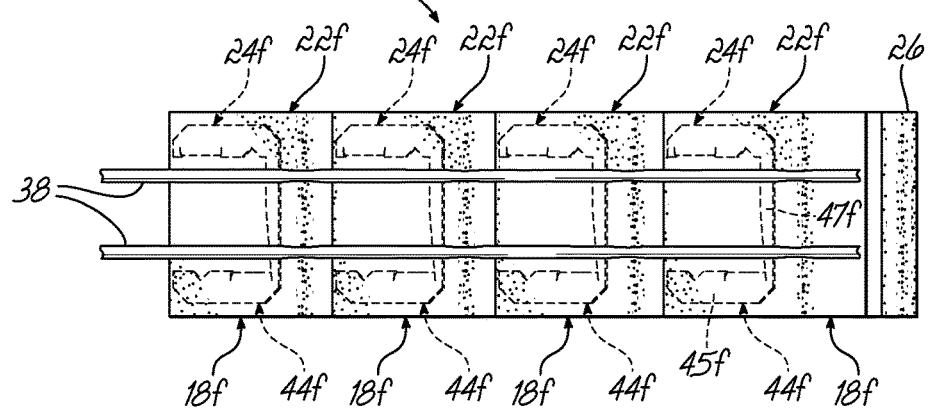
FIG. 37 is a top plan view of the portion of the collated string of clip assemblies of FIG. 36.
Figure 38:
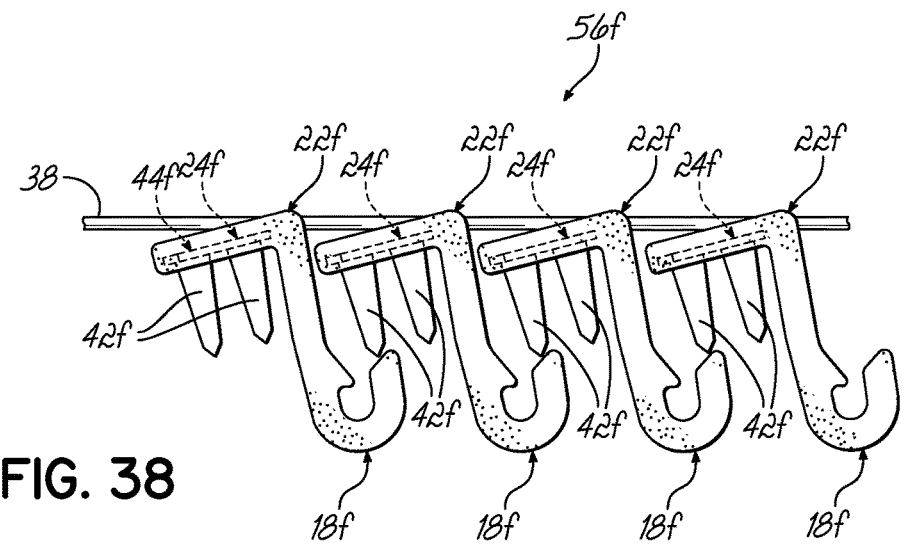
FIG. 38 is a side elevational view of the portion of the collated string of clip assemblies of FIG. 36.

As best shown in FIGS. 35 and 35A, the first piece 22f of clip assembly 18f comprises a U-shaped hook portion 26f adapted to receive and retain an end portion 21 of one of the sinuous springs 20. The first piece 18f further comprises a generally planar body portion 28f which includes a ledge 30f extending from one side edge 32f to the opposed side edge 32f of the body portion 28f of the first piece 22f of the clip assembly 18f. When the end portion 21 of one of the sinuous springs 20 is inserted into the U-shaped hook portion 26f, the ledge 30f of the body portion 28f holds or retains the end portion 21 of the sinuous spring 20 in a receptacle 31f, illustrated in FIG. 36. The first piece 22f of clip assembly 18f further comprises a generally planar flange portion 34f extending outwardly from the end of the body portion 28f opposite the U-shaped hook portion 26f in a direction generally orthogonal or perpendicular to the body portion 28f. As best shown in FIG. 35A, the flange portion 34f of the first piece 22f of clip assembly 18f has a pair of spaced parallel grooves 36f adapted to receive non-metallic connectors 38 which connect multiple clip assemblies 18f together, as shown in FIGS. 36-38. In some embodiments, the grooves 36f may be omitted. For example, clip assemblies 18g shown in FIGS. 39-40A lack grooves.

As best shown in FIGS. 35A-38, the second piece 24f of clip assembly 18f has a pair of tacks 42f extending downwardly from a generally planar, generally U-shaped body portion 44f of the second piece 24f of clip assembly 18f. More particularly, each of the tacks 42f extends downwardly from one of the sides 45f of the generally U-shaped body portion 44f of the second piece 24f of clip assembly 18f. As best shown in FIG. 37, the sides 45f of the generally U-shaped body portion 44f of the second piece 24f of clip assembly 18f are connected by a connecting portion 47f. Although the generally planar body portion 44f of clip assembly 18f is illustrated as being generally U-shaped, it may be generally rectangular or any other desired shape. The drawings are not intended to limit the configuration of the generally planar body portion 44f of clip assembly 18f.

As best shown in FIGS. 35A-38, the generally planar body portion 44f of clip assembly 18f is encased by or surrounded by the flange portion 34f of the first piece 22f of clip assembly 18f during a molding process. As best shown in FIG. 38, tacks 42f of the second piece 24f of clip assembly 18f are located and sized to pass through the flange portion 34f of the first piece 22f of clip assembly 18f. Each of the tacks 42f of the second piece 24f of clip assembly 18f is illustrated as being generally planar like the tacks 42a shown in FIG. 6A. However, each of the tacks 42f may have a crease therein so the tack 42f has a non-planar cross-section. Although not shown, the cross-section of each tack 42f may have a generally "V-shape", as shown in FIGS. 6 and 6B. Although not shown, each of the tacks 42f of the second piece 24f of clip assembly 18f, whether creased or not, may have a plurality of vertically spaced serrations or indentations like the serrations or indentations 48 shown in tacks 42 in FIGS. 6, 6B and 8 to improve the holding strength of the clip assembly 18f to the furniture frame 12.

As best illustrated in FIGS. 34, 35 and 35A, the tacks 42f of the second piece 24f of clip assembly 18f are secured inside one of the side walls 14 of furniture frame 12 with either an automated/mechanical machine or hand-held tool. When secured in place, the flange portion 34f of the first piece 22f of clip assembly 18f contacts or abuts an outer side surface 50 of one of the side walls 14 of furniture frame 12, and the body portion 28f of the first piece 22f of clip assembly 18f contacts or abuts an upper end surface 52 of one of the side walls 14 of furniture frame 12. As best shown in FIG. 35, the U-shaped hook portion 26f of the first piece 22f of clip assembly 18f is located generally above the inside side surface 54 of one of the side walls 14 of furniture frame 12. The tacks 42f of the clip assembly 18f enter the side walls 14 through the outer side surfaces 50 of the side walls 14 as shown in FIG. 35A.

FIG. 36 shows four clip assemblies 18f aligned in a similar orientation and having the flange portion 34f of the first piece 22f of clip assembly 18f contacting or proximate the body portion 28f of the first piece 22f of an adjacent clip assembly 18f. When the clip assemblies 18f are juxtaposed in such a manner, the grooves 36f of each clip assembly 18f are co-linearly aligned to permit a flexible connector 38 to be inserted into each of the aligned grooves 36 and extend the length of the aligned clip assemblies 18f As best shown in FIGS. 36-38, the two flexible connectors 38 are trapped or sandwiched in the first piece 22f of each clip assembly 18f, each flexible connector 38 being inside a plurality of aligned grooves 36f of multiple clip assemblies 18f.

Although FIGS. 36-38 show four clip assemblies 18f aligned in a string 56f of aligned collated clip assemblies 18f, the string 56f of aligned collated clip assemblies 18f may be made of any number of clip assemblies 18f connected together using connectors 38. In each of the aligned collated clip assemblies 18f, the connectors 38 are trapped inside the grooves 36f of the collated clip assembly 18f.

The connectors 38 used to interconnect adjacent aligned clip assemblies 18f into a string 56f are preferably fabricated from a plastic material, such as a low density polyethylene or polyester plastic. The connectors 38 provide flexibility in the collated string 56f of clip assemblies 18f which is needed when the string 56f is bent and rolled into a spool for insertion into a clinching tool. The connectors 38 have the required tensile strength to withstand pulling and twisting forces without breaking. Also, when a last clip assembly 18f is cut off from the string 56f, there are no sharp or jagged barbs left over to injure workers or tear fabric covering the clipped wires.

Figure 35C:
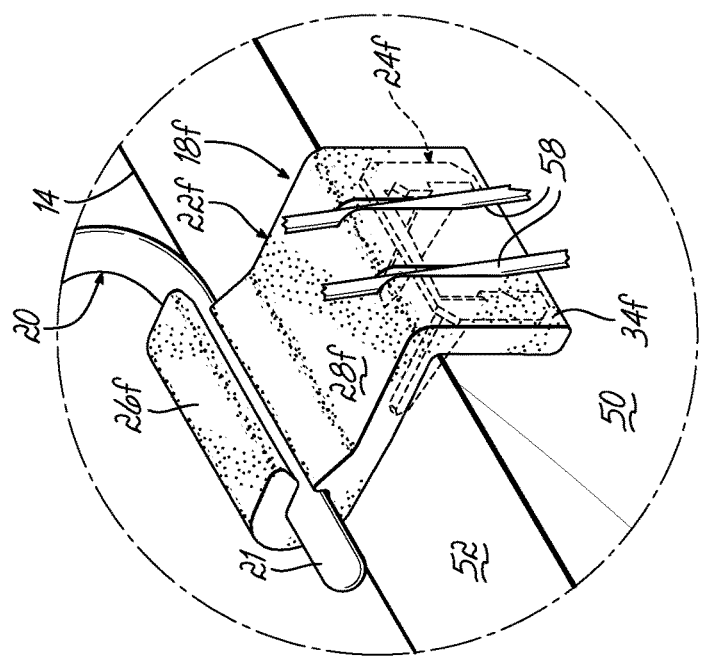
FIG. 35C is an enlarged view like the encircled area 35A showing pieces of connector secured to the clip assembly.
Figure 35B:
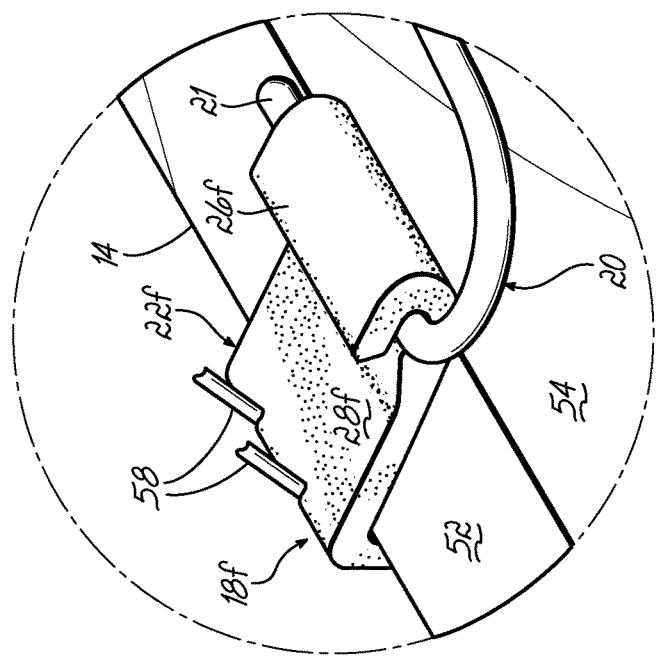
FIG. 35B is an enlarged view like the encircled area 35 showing pieces of connector secured to the clip assembly.

When used in a clipping tool, the connectors 38 may be broken between adjacent clip assemblies 18f in the collated string 56f of clip assemblies 18f, leaving portions 58 of the connectors 38 with the clip assembly 18f secured to the frame 12. FIGS. 35B and 35C illustrate two such clip assemblies 18f, each clip assembly 18f having portions 58 of the connectors 38 still with the clip assembly 18f when the clip assembly 18f is secured to one of the side walls 14 of frame 12.

Figure 36A:
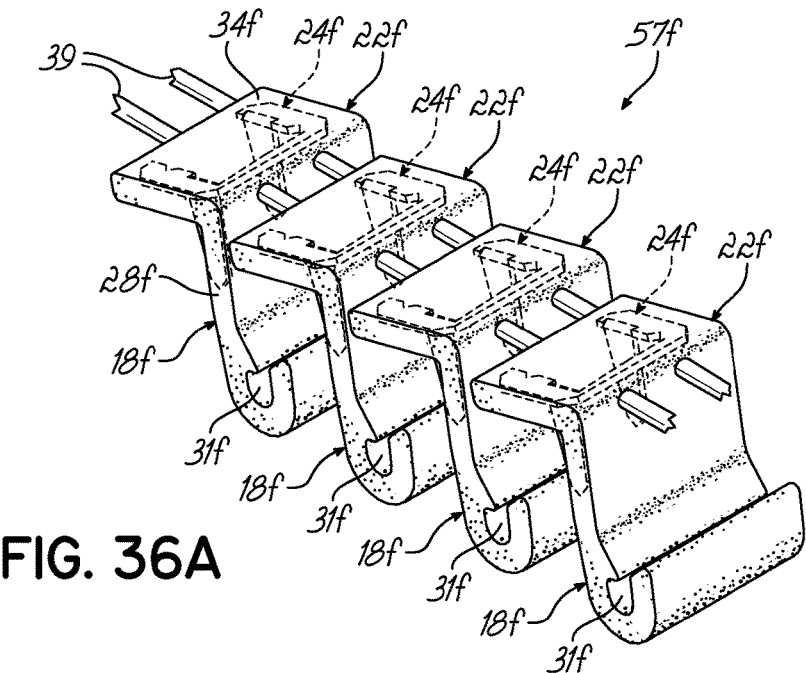
FIG. 36A is a perspective view of a portion of another collated string of clip assemblies.

FIG. 36A illustrates four clip assemblies 18f aligned in a string 57f of aligned collated clip assemblies. The string 57f of aligned collated clip assemblies 18f may be made of any number of clip assemblies 18f connected together using connectors. In each of the aligned collated clip assemblies 18f, connectors 39, made from the non-metallic or plastic material of the second pieces 22f of clip assemblies 18f, extend between the second pieces 22f of adjacent clip assemblies 18f. Connectors 39 may be broken where desired manually or by a clipping tool or by any known means.

Figure 36B:
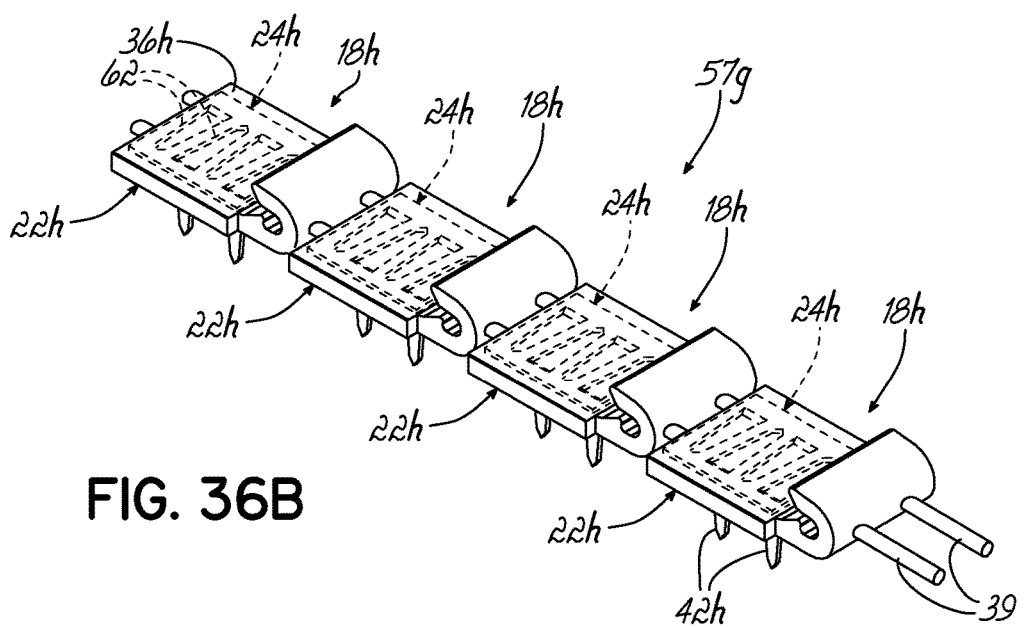
FIG. 36B is a perspective view of a portion of another collated string of clip assemblies.

FIG. 36B illustrates four clip assemblies 18h aligned in a string 57g of aligned collated clip assemblies. The string 57g of aligned collated clip assemblies 18h may be made of any number of clip assemblies 18h connected together using connectors 39. In each of the aligned collated clip assemblies 18h, connectors 39, made from the non-metallic or plastic material of the second pieces 22h of clip assemblies 18h, extend between the second pieces 22h of adjacent clip assemblies 18h. Connectors 39 may be broken where desired manually or by a clipping tool or by any known means.

Figure 39:
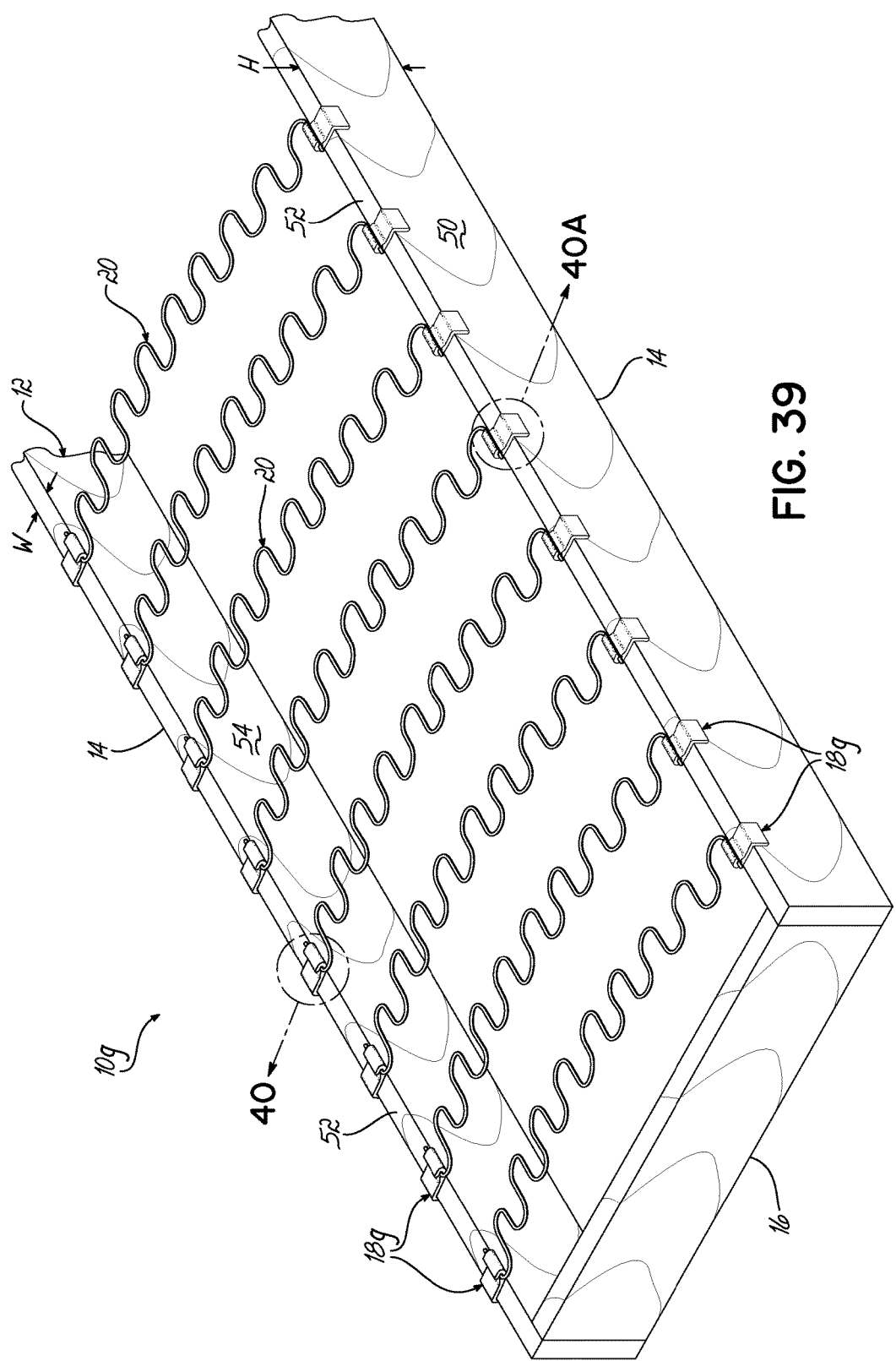
FIG. 39 is a perspective view of a furniture frame and sinuous springs extending from one side to the other side of the frame, clip assemblies in accordance with another embodiment being secured to the frame sides.

FIG. 39 illustrates a portion of a piece of furniture 10g comprising the same rectangular frame 12 illustrated in FIGS. 1 and 34. As shown in FIG. 39, furniture piece 10g further comprises a plurality of clip assemblies 18g secured to the side walls 14 of the frame 12 in a spaced manner for securing and retaining a plurality of sinuous springs 20. Clip assemblies 18g, secured to opposed side walls 14, are aligned to receive and retain end portions 21 of sinuous springs 20 in desired positions and under desired amounts of tension, as shown in FIG. 39. Commonly, such sinuous springs 20 are arched or bowed upwardly to provide resiliency to the furniture piece 10g.

Figure 40A:
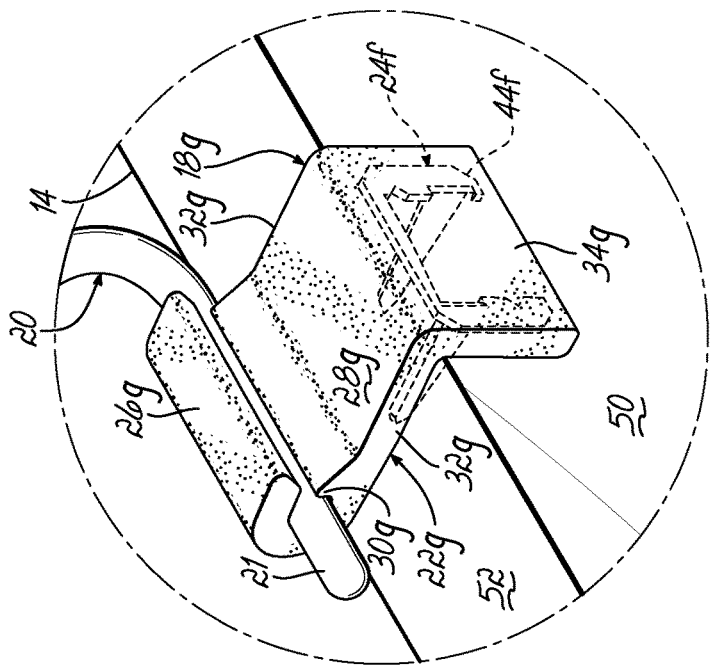
FIG. 40A is an enlarged view of the encircled area 40A of FIG. 39.
Figure 40:
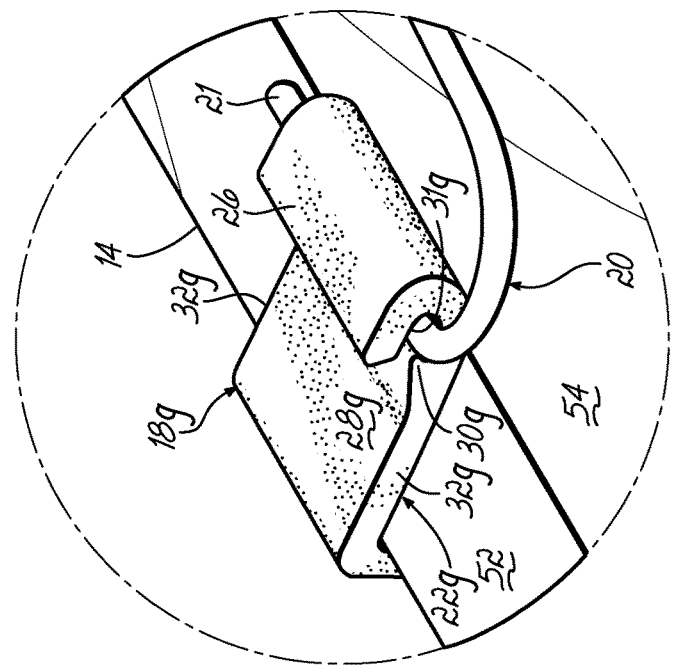
FIG. 40 is an enlarged view of the encircled area 40 of FIG. 39.

FIGS. 40 and 40A each show one of the clip assemblies 18g secured to one of the side walls 14 of frame 12. As best shown in FIG. 40A, each clip assembly 18g has a first piece 22g identical to the first piece 22f of clip assembly 18f without the grooves 36f. Each clip assembly 18g has a second metal piece 24f identical to the second metal piece 24f of clip assembly 18f. The pieces 22g, 24f are molded together into a unitary member and secured to one of the side walls 14 of the generally rectangular furniture frame 12.

As best shown in FIG. 40A, the first piece 22g of clip assembly 18g comprises a U-shaped hook portion 26g adapted to receive and retain an end portion 21 of one of the sinuous springs 20. The first piece 22g further comprises a generally planar body portion 28g which includes a ledge 30g extending from one side edge 32g to the opposed side edge 32g of the body portion 28g of the first piece 22g of the clip assembly 18g. When the end portion 21 of one of the sinuous springs 20 is inserted into the U-shaped hook portion 26g, the ledge 30g of the body portion 28g holds or retains the end portion 21 of the sinuous spring 20 in a receptacle 31g, illustrated in FIG. 40. The first piece 22g of clip assembly 18g further comprises a generally planar flange portion 34g extending outwardly from the end of the body portion 28g opposite the U-shaped hook portion 26g in a direction generally orthogonal or perpendicular to the body portion 28g. As best shown in FIG. 40A, the generally planar body portion 44f of the second piece 24f of clip assembly 18g is encased by or surrounded by the flange portion 34g of the first piece 22g of clip assembly 18g during a molding process. Rather than being secured together with connectors, these clip assemblies 18g may be stored and transported in a package 60 as shown in FIG. 9 or any other like container or package.

Figure 41:
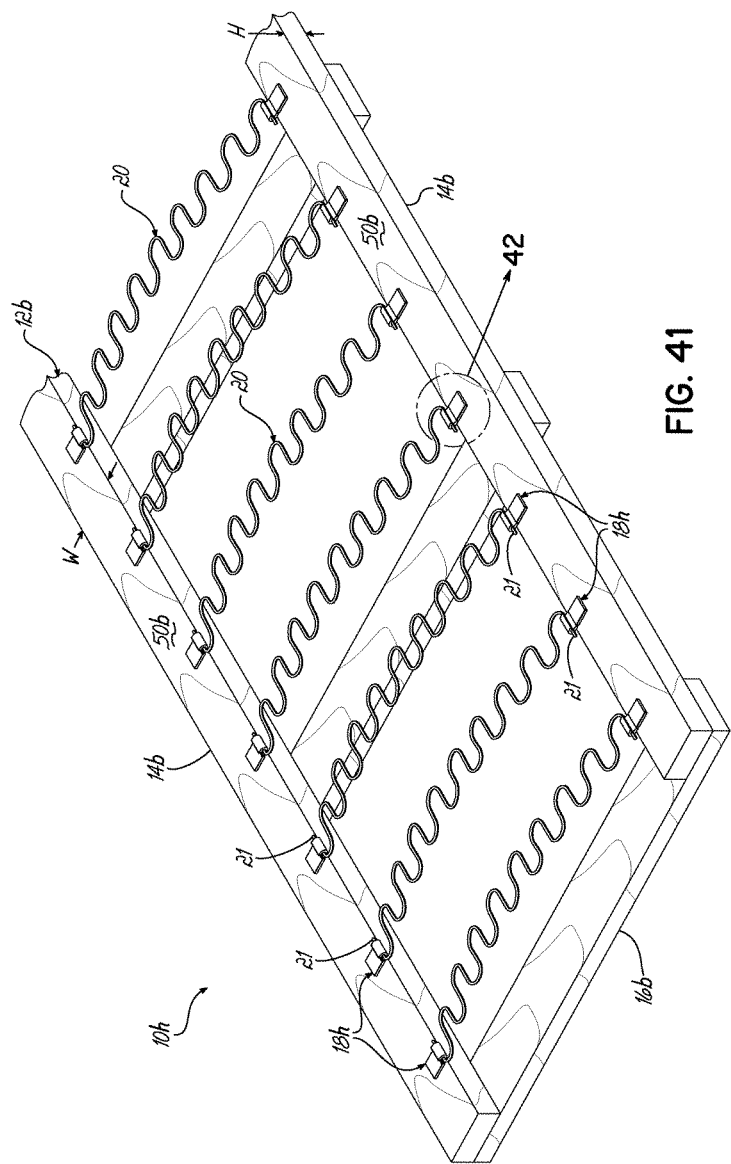
FIG. 41 is a perspective view of a frame and sinuous springs extending from one side to the other side of the frame, clip assemblies in accordance with another embodiment being secured to the frame sides.

FIG. 41 illustrates a portion of a piece of furniture 10h comprising a rectangular frame 12b comprising two side walls 14b and two end walls 16b (only one being shown in FIG. 41). The frame 12b is most commonly made of wood, but may be made of other suitable materials. Frame 12b is identical to the frame 12b shown in FIG. 10.

As shown in FIG. 41, furniture piece 10h further comprises a plurality of clip assemblies 18h secured to the side walls 14b of the frame 12b in a spaced manner for securing and retaining a plurality of sinuous springs 20. Clip assemblies 18h, secured to opposed side walls 14b, are aligned to receive and retain end portions 21 of sinuous springs 20 in desired positions and under desired amounts of tension, as shown in FIG. 41. Commonly, such sinuous springs 20 are arched or bowed upwardly to provide resiliency to the furniture piece 10h.

Figure 42A:
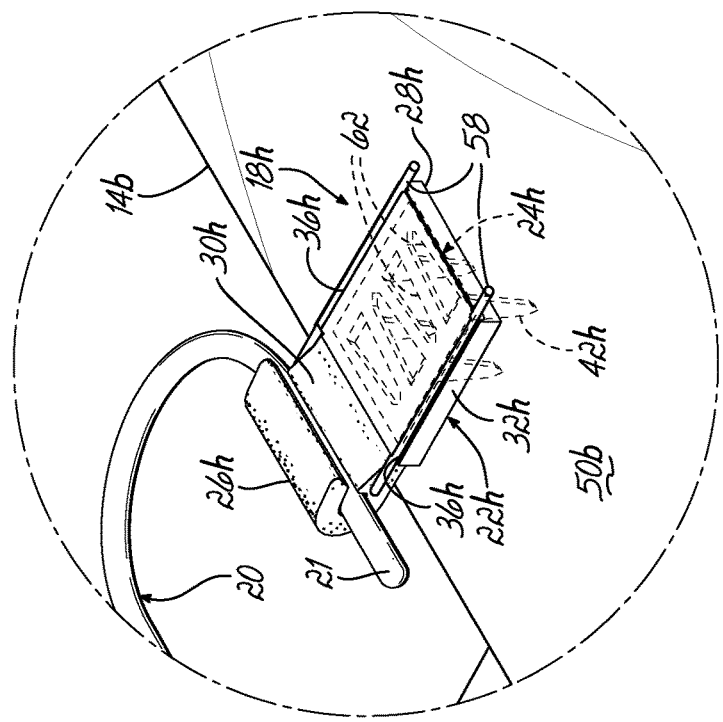
FIG. 42A is an enlarged view, similar to FIG. 42, of the clip assembly of FIG. 42 showing pieces of connector secured to the clip assembly.
Figure 42:
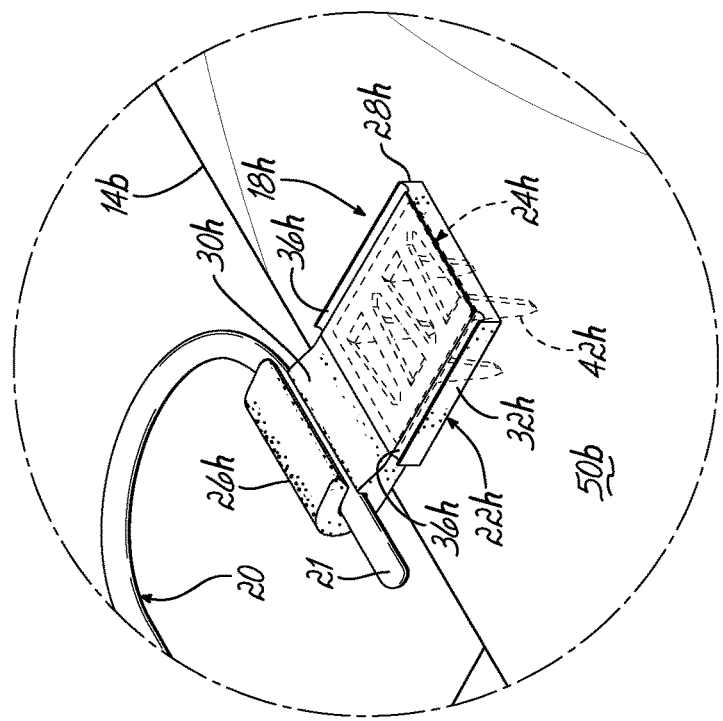
FIG. 42 is an enlarged view of the encircled area 42 of FIG. 41.

FIGS. 42 and 42A each show one of the clip assemblies 18h secured to one of the side walls 14b of frame 12b. As best shown in FIG. 42A, each clip assembly 18h comprises a first non-metallic piece 22h, usually made of plastic, and a second metal piece 24h molded together into a unitary member. The pieces 22h, 24h are joined together and secured to one of the side walls 14b of the generally rectangular furniture frame 12b.

Figure 43:
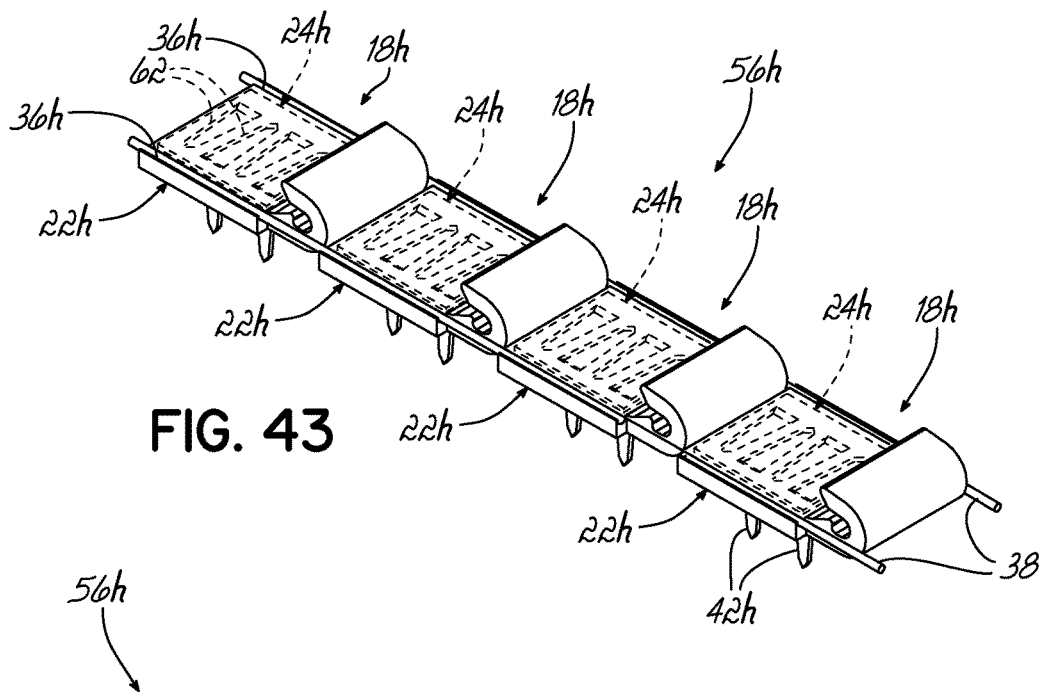
FIG. 43 is a perspective view of a portion of a collated string of clip assemblies of FIG. 41.
Figure 44:
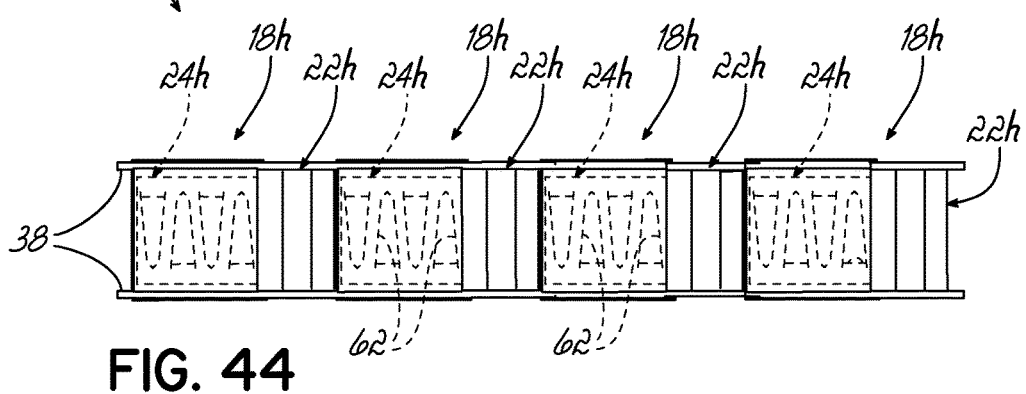
FIG. 44 is a top plan view of the portion of the collated string of clip assemblies of FIG. 43.
Figure 45:
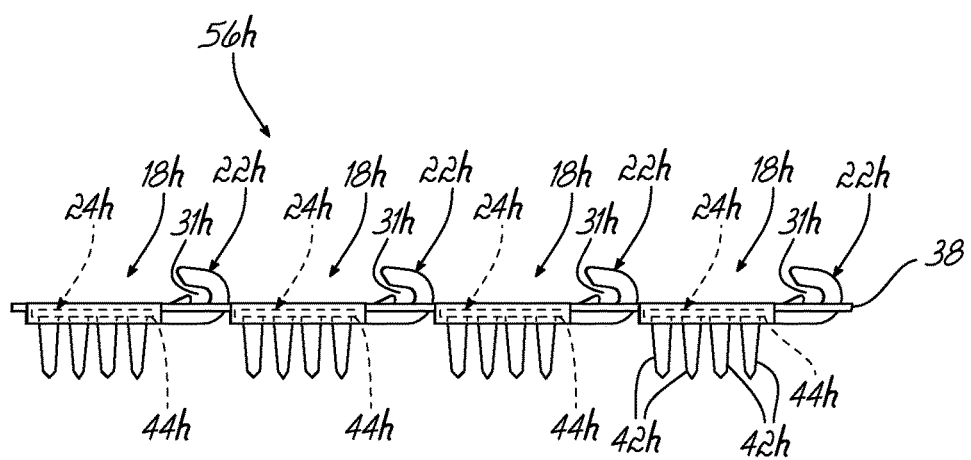
FIG. 45 is a side elevational view of the portion of the collated string of clip assemblies of FIG. 43.

As best shown in FIGS. 42-45, the first piece 22h of clip assembly 18h comprises a U-shaped hook portion 26h adapted to receive and retain an end portion 21 of one of the sinuous springs 20. The first piece 22h of clip assembly 18h further comprises a generally planar body portion 28h which includes a ledge 30h extending from one side edge 32h to the opposed side edge 32h of the body portion 28h of the first piece 22h of the clip assembly 18h. When the end portion 21 of one of the sinuous springs 20 is inserted into the U-shaped hook portion 26h, the ledge 30h of the body portion 28h holds or retains the end portion 21 of the sinuous spring 20 in a receptacle 31h, illustrated in FIG. 45. As best shown in FIG. 42, the body portion 28h of the first piece 22h of clip assembly 18h has a pair of spaced grooves 36h along the outer periphery of the body portion 16h, each of the grooves 36h being adapted to receive a non-metallic connector 38. Two connectors 38 connect multiple clip assemblies 18h together, as shown in FIGS. 43-45.

As best shown in FIG. 45, the second piece 24h of clip assembly 18h has four tacks 42h extending downwardly from a generally planar body portion 44h of the second metal piece 24h of clip assembly 18h. More particularly, each of the tacks 42h is formed from material from the body portion 44h of the second piece 24h of clip assembly 18h using a punch press. As best shown in FIGS. 42-44, tacks 24h initially lie in the plane of the body portion 44h and are bent downwardly out of the plane, thereby leaving four openings 62 in the body portion 44h of the second piece 24h of clip assembly 18h. The tacks 42h of the second piece 24h of clip assembly 18h are located and sized to pass through the first piece 22h of clip assembly 18h. Each of the tacks 42h of the second piece 24h of clip assembly 18h is generally planar, lacking the crease and serrations of the tacks 42c of the second piece 24c of clip assembly 18c, shown in FIG. 15A. However, each of the tacks 42h may have a crease therein so the tack 42h has a non-planar cross-section. Although not shown, the cross-section of each tack 42h may have a generally "V-shape", as shown in FIGS. 6 and 6B. Although not shown, each of the tacks 42h of the second piece 24h of clip assembly 18h, creased or not, may have a plurality of vertically spaced serrations or indentations like the serrations or indentations 48 shown in tacks 42 in FIGS. 6, 6B and 8 to improve the holding strength of the clip assembly 18h to the furniture frame 12b.

As best illustrated in FIGS. 41, 42 and 42A, the tacks 42h of the second piece 24h of clip assembly 18h are secured inside one of the side walls 14b of furniture frame 12b with a clipping tool (not shown). When secured in place, the body portion 28h of the first piece 22h of clip assembly 18h contacts or abuts an upper side surface 50b of one of the side walls 14b of furniture frame 12b. As best shown in FIGS. 42 and 42A, the U-shaped hook portion 26h of the first piece 22h of clip assembly 18h is located generally towards the interior of the rectangular frame 12b.

FIG. 43 shows four clip assemblies 18h aligned in a similar orientation and having the body portion 28h of the first piece 22h of a clip assembly 18h contacting or proximate the U-shaped hook portion 26h of the first piece 22h of an adjacent clip assembly 18h. When the clip assemblies 18h are juxtaposed in such a manner, the grooves 36h (see FIG. 42) of each clip assembly 18h are co-linearly aligned to permit a flexible connector 38 to be inserted into each of the aligned grooves 36h and extend the length of the aligned clip assemblies 18h. As best shown in FIGS. 43-45, each flexible connector 38 is inside a plurality of aligned grooves 36h of multiple clip assemblies 18h.

Although FIGS. 43-45 show four clip assemblies 18h aligned in a string 56h of aligned collated clip assemblies 18h, the string 56h of aligned collated clip assemblies 18h may be made of any number of clip assemblies 18h connected together.

The connectors 38 used to interconnect adjacent aligned clip assemblies 18h into a string 56h are preferably fabricated from a plastic material, such as a low density polyethylene or polyester plastic. The connectors 38 provide flexibility in the collated string 56h of clip assemblies 18h, which is needed when the string 56h is bent and rolled into a spool for insertion into a clipping tool. The connectors 38 have the required tensile strength to withstand pulling and twisting forces without breaking. Also, when a last clip assembly is cut off from the string 56h, there are no sharp or jagged barbs left over to injure workers or tear fabric covering the clipped wires.

When used in a clipping tool, the connectors 38 may be broken between adjacent clip assemblies 18h in the collated string 56h of clip assemblies 18h, leaving portions 58 of the connectors 38 with the clip assembly 18h secured to the frame 12b. FIG. 42A illustrates one such clip assembly 18h, each clip assembly 18h having portions 58 of the connectors 38 still with the clip assembly 18h when the clip assembly 18h is secured to one of the side walls 14b of frame 12b.

Figure 43A:
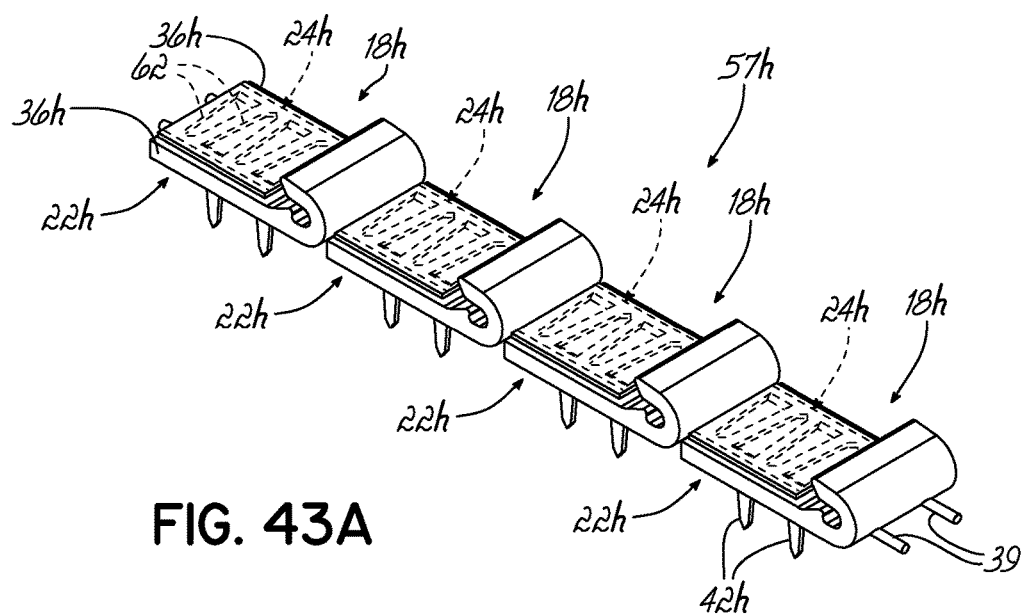
FIG. 43A is a perspective view of a portion of another collated string of clip assemblies.

FIG. 43A illustrates four clip assemblies 18h aligned in a string 57h of aligned collated clip assemblies. The string 57h of aligned collated clip assemblies 18h may be made of any number of clip assemblies 18h connected together using connectors 39. In each of the aligned collated clip assemblies 18h, connectors 39, made of the same material of the second pieces 22 of clip assemblies 18h, extend between the second pieces 22h of adjacent clip assemblies 18h. Connectors 39 may be broken where desired in a clipping tool, manually or in any known manner.

Figure 46A:
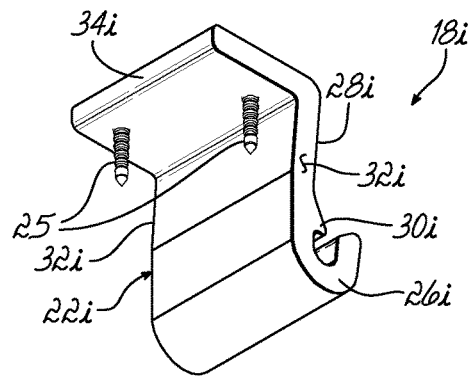
FIG. 46A is a bottom perspective view of a portion of another clip assembly.

FIGS. 46A-46E shows another variation of clip assembly 18i. As best shown in FIG. 46A, each clip assembly 18i has a first plastic or non-metallic piece 22i identical to the first piece 22g of clip assembly 18g without the grooves. Each clip assembly 18i has a pair of fasteners 25. Although two fasteners 25 are illustrated, any number of fasteners may be used. Each of the fasteners 25 is a unitary ribbed fastener, preferably made of metal, having a generally planar head 29 and a ribbed shank 70, shown in detail in FIGS. 48A and 48B.

Figure 48A:
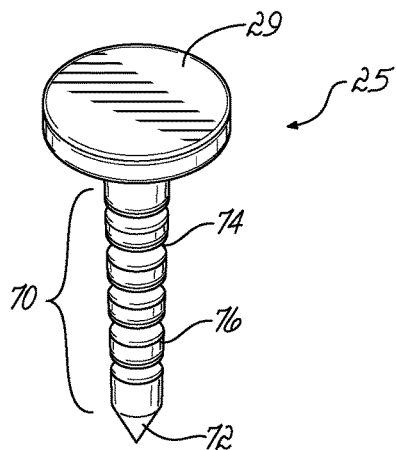
FIG. 48A is a perspective view of one metal fastener used in the clip assemblies of FIGS. 46A-47C.
Figure 48B:
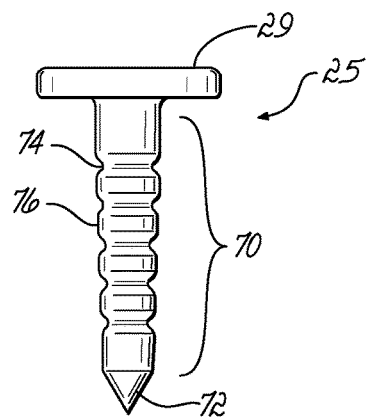
FIG. 48B is a side elevational view of the metal fastener of FIG. 48A.

As shown in FIGS. 48A and 48B, the shank 70 of fastener 25 has a pointed or conical end 72 opposite the generally planar head 29 and a plurality of grooves 74 between which are the ribs 76. Although the drawings show grooves 74 of shank 70 being equidistant from each other, they may be any desired size and placed in any desired locations. The drawings are not intended to be limiting. The ribs 76 and grooves 76 help hold the shank 70 inside the wood of a frame 12. The piece 22i and metal fasteners 25 are molded together into a clip assembly 18i and secured to one of the side walls 14 of the generally rectangular furniture frame 12.

Figures 46B, 46C:
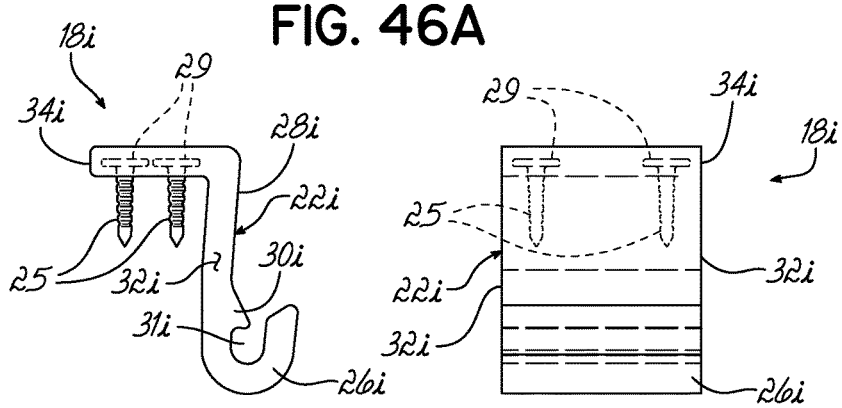
FIG. 46B is a side elevational view of the clip assembly of FIG. 46A.
FIG. 46C is a front view of the clip assembly of FIG. 46A.
Figure 46D:
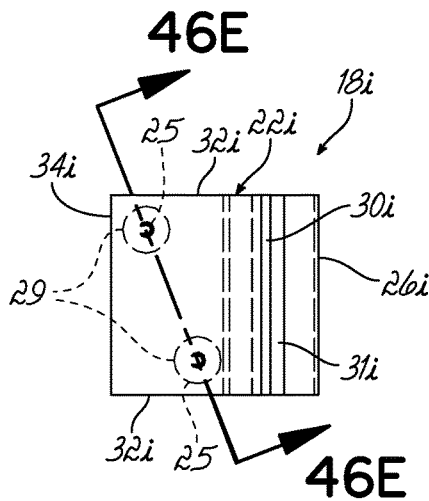
FIG. 46D is a top view of the clip assembly of FIG. 46A.
Figure 46E:
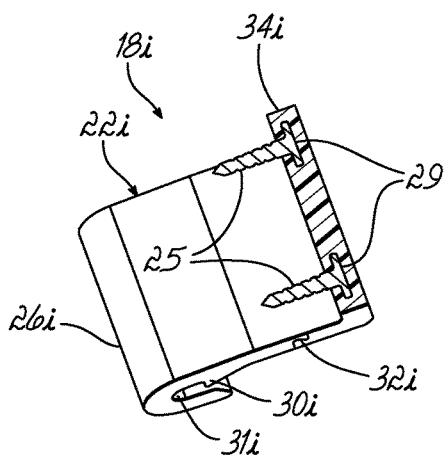
FIG. 46E is a cross sectional view taken along the line 46E-46E of FIG. 46D.
Figure 53A:
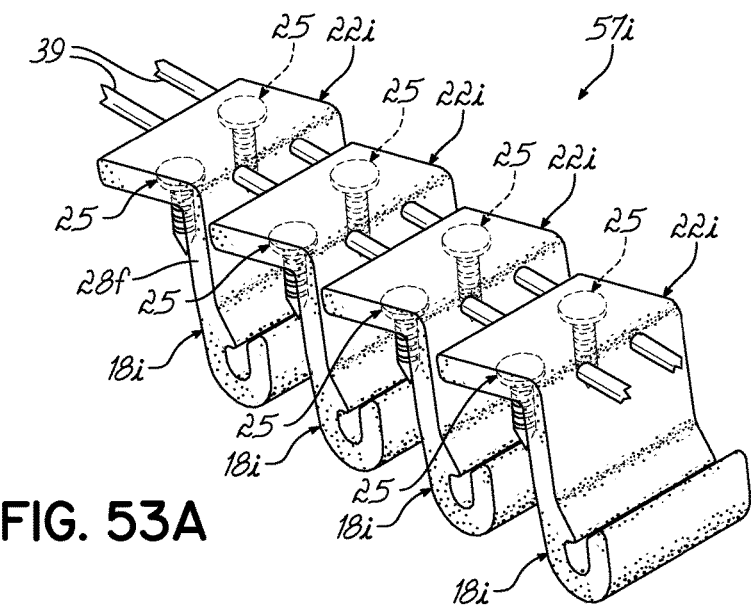
FIG. 53A is a perspective view of a portion of a collated string of clip assemblies of FIGS. 46A-46E.

As best shown in FIG. 46A, the first piece 22i of clip assembly 18i comprises a U-shaped hook portion 26i adapted to receive and retain an end portion 21 of one of the sinuous springs 20. The first piece 22i further comprises a generally planar body portion 28i which includes a ledge 30i extending from one side edge 32i to the opposed side edge 32i of the body portion 28i of the first piece 22i of the clip assembly 18i. When the end portion 21 of one of the sinuous springs 20 is inserted into the U-shaped hook portion 26i, the ledge 30i of the body portion 28i holds or retains the end portion 21 of the sinuous spring 20 in a receptacle 31i, illustrated in FIG. 46B. The first piece 22i of clip assembly 18i further comprises a generally planar flange portion 34i extending outwardly from the end of the body portion 28i opposite the U-shaped hook portion 26i in a direction generally orthogonal or perpendicular to the body portion 28i. As best shown in FIG. 46C, the heads 29 and upper portions of the shanks 70 of the fasteners 25 of clip assembly 18i are encased by or surrounded by the flange portion 34i of the first piece 22i of clip assembly 18i during a molding process. Rather than being secured together with flexible connectors, these clip assemblies 18i may be stored and transported in a package 60, as shown in FIG. 9 or molded together as shown in FIG. 53A and described below.

Figure 47A:
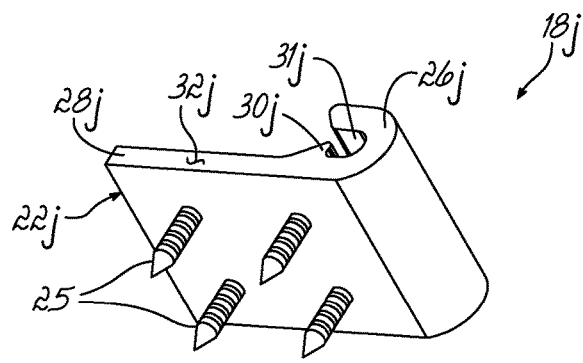
FIG. 47A is a bottom perspective view of a portion of another clip assembly.
Figure 47B:
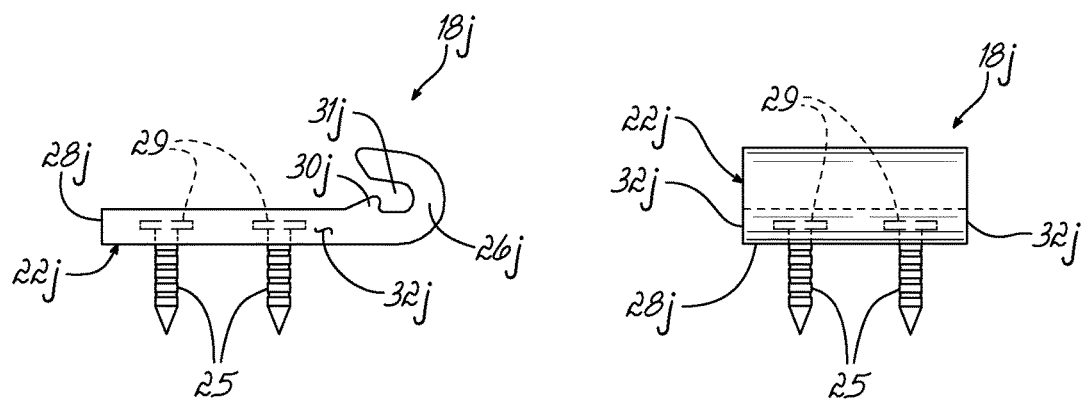
FIG. 47B is a side elevational view of the clip assembly of FIG. 47A.
Figure 47C:
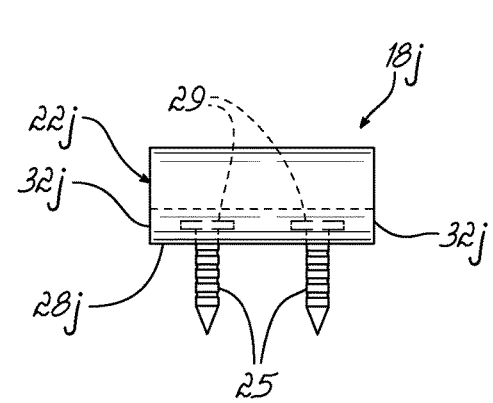
FIG. 47C is a front view of the clip assembly of FIG. 47A.

FIGS. 47A-47C show another variation of clip assembly 18j. As best shown in FIG. 47A, each clip assembly 18j has a first non-metallic or plastic piece 22j identical to the first piece 22h of clip assembly 18h without the grooves shown in FIGS. 42-45. Each clip assembly 18j has four fasteners 25. Although four fasteners 25 are illustrated, any number of fasteners may be used. Each of the fasteners 25 is a unitary ribbed fastener, preferably made of metal, having a generally planar head 29 and a ribbed shank 70, shown in detail in FIGS. 48A and 48B and described above. The piece 22j and fasteners 25 are molded together into a unitary member and secured to one of the side walls 14 of the generally rectangular furniture frame 12.

Figure 53B:
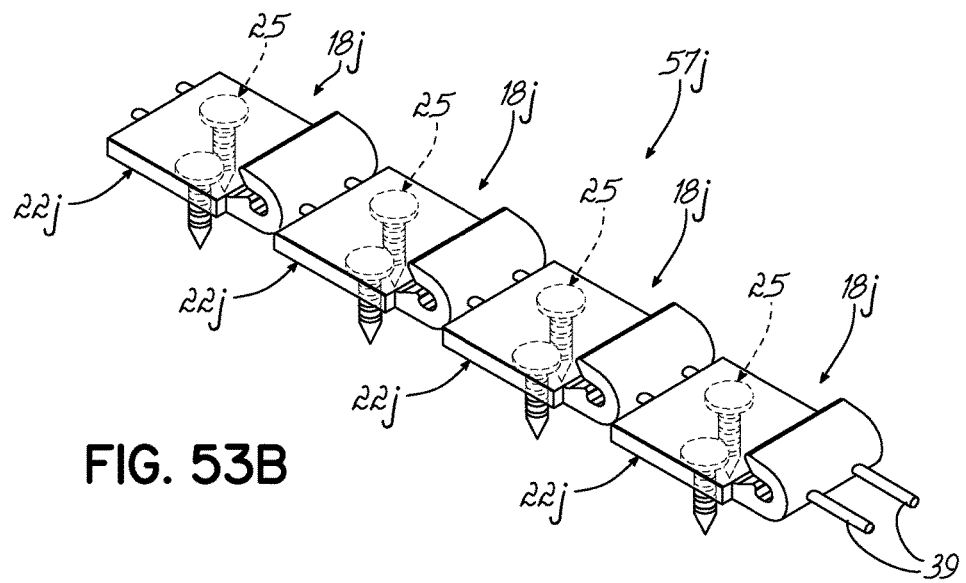
FIG. 53B is a perspective view of a portion of a collated string of clip assemblies of FIGS. 47A-47C.

As best shown in FIG. 47A, the first piece 22j of clip assembly 18j comprises a U-shaped hook portion 26j adapted to receive and retain an end portion 21 of one of the sinuous springs 20. The first piece 22j further comprises a generally planar body portion 28j which includes a ledge 30j extending from one side edge 32j to the opposed side edge 32j of the body portion 28j of the first piece 22j of the clip assembly 18j. When the end portion 21 of one of the sinuous springs 20 is inserted into the U-shaped hook portion 26j, the ledge 30j of the body portion 28j holds or retains the end portion 21 of the sinuous spring 20 in a receptacle 31j, illustrated in FIG. 47A. As best shown in FIG. 47C, the heads 29 and an upper portion, but not all, of the shanks 70 of the fasteners 25 of clip assembly 18j, are encased by or surrounded by the body portion 28j of the first piece 22j of clip assembly 18j during a molding process. Rather than being secured together with connectors, these clip assemblies 18j may be stored and transported in a package 60, as shown in FIG. 9 or molded together as shown in FIG. 53B and described below.

Figure 49A:
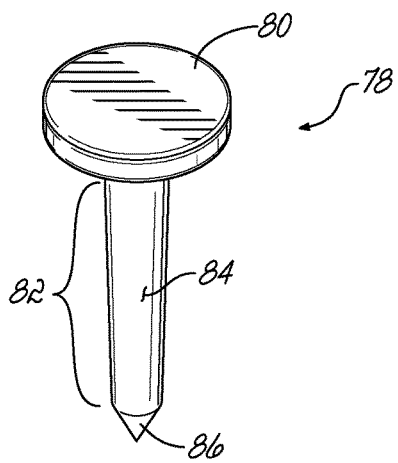
FIG. 49A is a perspective view of another metal fastener which may be used in the clip assemblies of FIGS. 46A-47C.
Figure 49B:
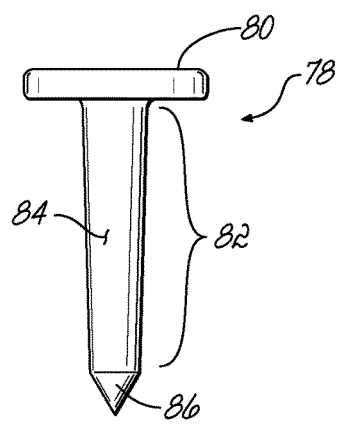
FIG. 49B is a side elevational view of the metal fastener of FIG. 49A.

FIGS. 49A and 49B illustrate another embodiment of metal fastener 78 which may be used in place of metal fastener 25 in any of the embodiments shown or described herein, particularly clip assembly 18i shown in FIGS. 46A-46E and clip assembly 18j shown in FIGS. 47A-47C. Each of the fasteners 78 is a unitary fastener, preferably made of metal, having a generally planar head 80 and a tapered shank 82, shown in detail in FIGS. 49A and 49B. The tapered shank 82 of fastener 78 has a smooth exterior surface 84 with no grooves or ribs. The tapered shank 82 has a pointed or conical end 86 opposite the generally planar head 80. The shank 82 has a circular cross-section which decreases in diameter from its upper end proximate the generally planar head 80 towards its lower end at the bottom of the conical end 86. Although the drawings show tapered shank 82 being a certain length, the shank may be any desired length. The drawings are not intended to be limiting.

Figure 50A:
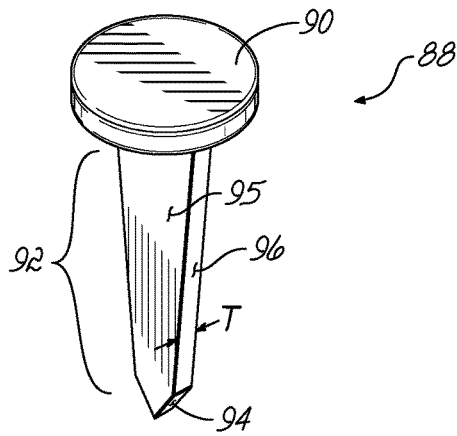
FIG. 50A is a perspective view of another metal fastener which may be used in the clip assemblies of FIGS. 46A-47C.
Figure 50B:
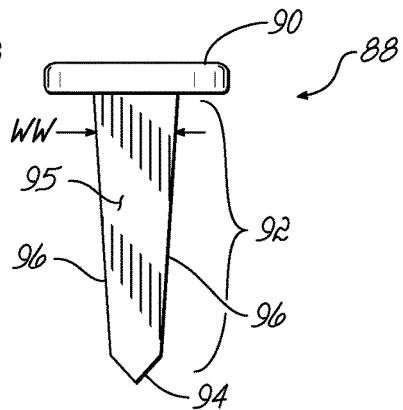
FIG. 50B is a side elevational view of the metal fastener of FIG. 50A.

FIGS. 50A and 50B illustrate another embodiment of metal fastener 88 which may be used in place of fastener 25 in any of the embodiments shown or described herein, particularly clip assembly 18i shown in FIGS. 46A-46E and clip assembly 18j shown in FIGS. 47A-47C. Each of the fasteners 88 is a unitary fastener, preferably made of metal, having a generally planar head 90 and a tapered shank 92, shown in detail in FIGS. 50A and 50B. The tapered shank 92 of fastener 88 has parallel smooth exterior first and second surfaces 95 with no grooves or ribs. The linear distance between the smooth exterior first and second surfaces 95 defines a thickness "T" of the shank 92 which is uniform along the length of the shank 92. The tapered shank 92 has a pointed end 94 opposite the generally planar head 90. The shank 92 decreases in width "WW" (linear distance between side edges 96) from its upper end proximate the generally planar head 90 to its lower end 94. Although the drawings show smooth exterior first and second surfaces 95 of shank 92, they need not be smooth. The drawings are not intended to be limiting.

FIGS. 51A, 51B and 51C illustrate another embodiment of metal fastener 98 which may be used in place of fastener 25 in any of the embodiments shown or described herein, particularly clip assembly 18i shown in FIGS. 46A-46E and clip assembly 18j shown in FIGS. 47A-47C. Each of the fasteners 98 is a unitary fastener, preferably made of metal, having a generally planar head 100 and a creased and serrated shank 102. The shank 102 has a central crease 104 extending along its length dividing the shank 102 into first and second sides 106 extending outwardly from crease 104, as best shown in FIG. 51C. The sides are separated by an angle 108, best shown in FIG. 51C. The tapered shank 102 has a pointed end 110 opposite the generally planar head 100. Each side 106 of shank 102 decreases in width from its upper end proximate the generally planar head 100 to its lower end. Each side of shank 102 has a serrated outer edge 112 having spaced serrations or indentations 114. Although the drawings show three indentations 114 per side 106 evenly spaced apart, the indentations may be any desired size and at any desired locations. Although the drawings show the sides 106 spaced apart by angle 108, the angle may be any desired angle. The drawings are not intended to be limiting. The crease 104 and serrations 114 help hold the shank 102 inside the wood of a frame 12.

FIGS. 52A, 52B and 52C illustrate another embodiment of metal fastener 116 which may be used in place of fastener 25 in any of the embodiments shown or described herein, particularly clip assembly 18i shown in FIGS. 46A-46E and clip assembly 18j shown in FIGS. 47A-47C. Each of the fasteners 116 is a unitary fastener, preferably made of metal, having a generally planar head 118 and a creased shank 120. The shank 120 has a central crease 122 extending along its length dividing the shank 120 into first and second sides 124 extending outwardly from crease 122, as best shown in FIG. 52C. The sides 124 are separated by an angle 128, best shown in FIG. 52C. The tapered shank 120 has a pointed end 130 opposite the generally planar head 118. Each side 124 of creased shank 120 decreases in width from its upper end proximate the generally planar head 118 to its lower end. Each side 124 of shank 120 has a smooth outer edge 132 and a uniform thickness. Although the drawings show the sides 124 spaced apart by angle 128, the angle may be any desired angle. The drawings are not intended to be limiting. The central crease 122 helps hold the shank 120 inside the wood of a frame 12.

FIG. 53A illustrates four clip assemblies 18i aligned in a string 57i of aligned collated clip assemblies. The string 57i of aligned collated clip assemblies 18i may be made of any number of clip assemblies 18i connected together using connectors 39. In each of the aligned collated clip assemblies 18i, connectors 39, made of the same material of the plastic or non-metallic pieces 22i of clip assemblies 18i, extend between the pieces 22i of adjacent clip assemblies 18i. Connectors 39 may be broken where desired in a clipping tool, manually or any other known manner to separate adjacent clip assemblies.

FIG. 53B illustrates four clip assemblies 18j aligned in a string 57j of aligned collated clip assemblies. The string 57j of aligned collated clip assemblies 18j may be made of any number of clip assemblies 18j connected together using connectors 39. In each of the aligned collated clip assemblies 18j, connectors 39, made of the same material of the plastic or non-metallic pieces 22j of clip assemblies 18j, extend between the pieces 22j of adjacent clip assemblies 18j. Connectors 39 may be broken where desired in a clipping tool, manually or any other known manner to separate adjacent clip assemblies.

Although the tacks and shanks are shown having a certain cross-sectional configuration, they may be other sizes or shapes. Similarly, the openings in the non-metallic pieces of the clip assemblies may be any desired shapes or sizes. Although we have described several embodiments of the invention, we do not intend to be limited except by the scope of the following claims.

We claim:

1. A clip assembly for securing an end portion of a sinuous spring to a wooden rail, said clip assembly comprising:
   a plastic piece comprising a generally planar body portion, a U-shaped hook portion extending outwardly from one end of the body portion, the hook portion being adapted to receive and retain the end portion of the sinuous spring, and a generally planar flange portion extending outwardly from the other end of the body portion in a direction generally perpendicular to the body portion; and
   at least two metal fasteners, each metal fastener having a generally planar head and a shank,
   wherein the metal fasteners and plastic piece are molded together into a unitary member, the head of each metal fastener being encased by the flange portion of the plastic piece, the shank of the metal fastener extending through the plastic piece and being adapted to extend into the wooden rail.

2. The clip assembly of claim 1, wherein the shank of at least one metal fastener is ribbed.

3. The clip assembly of claim 1, wherein the shank of each metal fastener is ribbed.

4. The clip assembly of claim 1, wherein the shank of at least one metal fastener is serrated.

5. The clip assembly of claim 1, wherein the shank of at least one metal fastener is generally planar.

6. The clip assembly of claim 1, wherein the clip assembly has two metal fasteners.

7. The clip assembly of claim 1, wherein the shank of at least one of the metal fasteners is creased.

8. The clip assembly of claim 1, wherein the head of each metal fastener is circular.

9. The clip assembly of claim 1, wherein the generally planar body portion of the plastic piece has a ledge extending from one side edge to the opposed side edge of the plastic piece.

10. A clip assembly for securing an end portion of a sinuous spring to a wooden rail, said clip assembly comprising:

a non-metallic piece comprising a generally planar body portion, a U-shaped hook portion extending outwardly from one end of the body portion and a generally planar flange portion extending outwardly from the other end of the body portion in a direction generally perpendicular to the body portion, wherein the generally planar body portion of the non-metallic piece has a ledge extending from one side edge to the opposed side edge of the non-metallic piece, the hook portion and ledge being adapted to receive and retain the end portion of the sinuous spring; and at least two metal fasteners, each metal fastener having a generally planar head and a shank;

wherein the metal fastener and non-metallic piece are molded together into a unitary member, the head of each metal fastener being encased by the flange portion of the non-metallic piece, the shank of the metal fastener being adapted to extend into the wooden rail.

11. The clip assembly of claim 10, wherein the head of each metal fastener is circular.

12. The clip assembly of claim 10, wherein the shank of at least one metal fastener is ribbed.

13. The clip assembly of claim 10, wherein at least one of the shanks of the metal fastener is serrated.

14. The clip assembly of claim 10, wherein the shank of at least one metal fastener has a uniform thickness.

15. The clip assembly of claim 10, wherein the shank of at least one of the metal fasteners is creased.

16. The clip assembly of claim 10, wherein the clip assembly has two metal fasteners.

17. A clip assembly for securing an end portion of a sinuous spring to a wooden rail, said clip assembly comprising:

a non-metallic piece comprising a generally planar body portion, a U-shaped hook portion extending outwardly from one end of the body portion and a generally planar flange portion extending outwardly from the other end of the body portion in a direction generally perpendicular to the body portion, wherein the generally planar body portion of the non-metallic piece has a ledge extending from one side edge to the opposed side edge of the plastic piece, the hook portion and ledge being adapted to receive and retain the end portion of the sinuous spring; and two spaced metal fasteners, each metal fastener having a generally planar head and a shank, wherein the metal fasteners and non-metallic piece are molded together into a unitary member, the head of each metal fastener being encased by the flange portion of the non-metallic piece, the shanks of the metal fasteners extending through the flange portion of the non-metallic piece and being adapted to extend into the wooden rail.

18. The clip assembly of claim 17 wherein the head of at least one metal fastener is circular.

19. The clip assembly of claim 17, wherein the clip assembly has two metal fasteners.

20. The clip assembly of claim 17, wherein the shank of at least one metal fastener is ribbed.

21. The clip assembly of claim 17, wherein at least one of the shanks of the metal fastener is serrated.

22. The clip assembly of claim 17, wherein the shank of at least one metal fastener has a uniform thickness.

23. The clip assembly of claim 17, wherein the shank of at least one of the metal fasteners is creased.

* * * * *